US012726954B2

(12) United States Patent
Cheng et al.

(10) Patent No.: US 12,726,954 B2
(45) Date of Patent: Sep. 1, 2026

(54) COMMUNICATION METHOD AND INFORMATION PROCESSING APPARATUS

(71) Applicant: Huawei Technologies Co., Ltd., Shenzhen (CN)

(72) Inventors: Xingqing Cheng, Beijing (CN); Lei Gao, Beijing (CN); Guanjun Ni, Shanghai (CN); Jian Wang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 301 days.

(21) Appl. No.: 18/392,440

(22) Filed: Dec. 21, 2023

(65) Prior Publication Data

US 2024/0129907 A1 Apr. 18, 2024

Related U.S. Application Data

(63) Continuation of application No. PCT/CN2021/102299, filed on Jun. 25, 2021.

(51) Int. Cl.

| | |
|---|---|
| ***H04W 72/0446*** | (2023.01) |
| ***H04J 13/00*** | (2011.01) |
| ***H04W 72/0453*** | (2023.01) |
| ***H04W 72/51*** | (2023.01) |

(52) U.S. Cl.

CPC ..... *H04W 72/0446* (2013.01); *H04J 13/0025* (2013.01); *H04J 13/0029* (2013.01); *H04W 72/0453* (2013.01); *H04W 72/51* (2023.01)

(58) Field of Classification Search

CPC ......... H04W 72/0446; H04W 72/0453; H04W 72/51; H04J 13/0025; H04J 13/0029; H04L 1/1607; H04L 1/1861; H04L 1/1896; H04L 1/16

See application file for complete search history.

(56) References Cited

U.S. PATENT DOCUMENTS

| | | | | |
|---|---|---|---|---|
| 7,570,916 B2 | 8/2009 | Xiao et al. | | |
| 12,244,421 B2 * | 3/2025 | Khoshnevisan | ...... | H04L 1/1621 |
| 2008/0049749 A1 * | 2/2008 | Xiao | .................... | H04W 72/30 370/328 |

(Continued)

FOREIGN PATENT DOCUMENTS

| | | |
|---|---|---|
| CN | 101621361 A | 1/2010 |
| WO | 2020091683 A1 | 5/2020 |

OTHER PUBLICATIONS

AngeloCCC "The generation principle and properties of m sequence," May 6, 2019, with English translation, 15 pages.

*Primary Examiner* — Abdullahi E Salad

(74) *Attorney, Agent, or Firm* — Conley Rose, P.C.

(57) ABSTRACT

First information is sent using a multicast resource to a communication apparatus group that includes at least two communication apparatuses. Feedback information is detected, on a shared unified time-frequency resource, from at least one communication apparatus in the communication apparatus group, where the feedback information indicates that there is at least one communication apparatus in the group that fails to correctly receive the first information, where the time-frequency resource is a feedback resource used by all communication apparatus in the communication apparatus group to send feedback information.

20 Claims, 6 Drawing Sheets

501: A second communication apparatus obtains a second identifier of the second communication apparatus

↓

502: The second communication apparatus may obtain a complex sequence based on the second identifier of the second communication apparatus

↓

503: The second communication apparatus obtains a common complex sequence set

↓

504: The second communication apparatus may obtain N sub-sequences based on the complex sequence and the common complex sequence set

(56) References Cited

U.S. PATENT DOCUMENTS

| | | | | |
|---|---|---|---|---|
| 2016/0174194 | A1* | 6/2016 | Suzuki | H04W 76/12 370/312 |
| 2017/0063562 | A1 | 3/2017 | Cariou et al. | |
| 2019/0165841 | A1* | 5/2019 | Dong | H04B 7/0417 |
| 2021/0111835 | A1* | 4/2021 | Khoshnevisan | H04W 72/02 |
| 2022/0182160 | A1* | 6/2022 | Su | H04B 17/309 |
| 2022/0217696 | A1* | 7/2022 | Zhao | H04L 5/0048 |
| 2022/0224491 | A1* | 7/2022 | Salim | H04L 5/0055 |

* cited by examiner

COMMUNICATION METHOD AND INFORMATION PROCESSING APPARATUS

CROSS-REFERENCE TO RELATED APPLICATIONS

This is a continuation of International Patent Application No. PCT/CN2021/102299 filed on Jun. 25, 2021, which is hereby incorporated by reference in its entirety.

TECHNICAL FIELD

This disclosure provides a communication method and an information processing apparatus, and relates to the field of communication technologies, and in particular, to a short-range wireless communication technology.

BACKGROUND

With continuous development of communication technologies, more service requirements are proposed, such as a multimedia service. For example, in a communication domain, when same content needs to be transmitted to a plurality of users, point-to-multipoint transmission is more efficient than point-to-point transmission. Therefore, a multicast service needs to be introduced. One communication domain may include one primary node and at least two secondary nodes. The primary node schedules the secondary node, so that service data can be transmitted between the primary node and the secondary node.

The multicast service may be classified into reliable multicast and unreliable multicast based on whether a receiving node needs to feed back an acknowledgement (ACK) character or a negative acknowledgement (NACK) character. The unreliable multicast means that a receiving node does not need to feed back whether a multicast signal sent by a sending node is correctly received. The reliable multicast means that each receiving node in a group needs to feed back, to a sending node, feedback information about whether a multicast signal is correctly received. The sending node resends a multicast signal provided that the sending node determines that a receiving node in the group fails to correctly receive the multicast signal. For the reliable multicast, each receiving node needs to feed back feedback information about whether the multicast signal is correctly received. Therefore, different feedback resources need to be allocated to all receiving nodes. In other words, different feedback resources or different equivalent feedback resources need to be allocated to all the receiving nodes in the group (for example, feedback resources allocated to all the receiving nodes are the same, but air interface channels that the feedback resources pass through are different, and because a channel coefficient may also be considered as a part of a resource, from perspectives of the receiving nodes, received equivalent resources are different). However, when there is an excessively large quantity of receiving nodes in the group, more feedback information needs to be sent. Consequently, a large quantity of feedback resources needs to be occupied.

In conclusion, how to improve feedback efficiency by using limited resources is an urgent technical problem to be resolved currently.

SUMMARY

This disclosure provides a communication method and an information processing apparatus, to improve feedback efficiency as much as possible by using limited resources, so as to improve communication performance.

According to a first aspect, this disclosure provides a communication method. The method may include sending first information to a second communication apparatus group including at least two second communication apparatuses, and detecting, on a first time-frequency resource, feedback information from at least one second communication apparatus in the second communication apparatus group, where the first time-frequency resource is a feedback resource used for any second communication apparatus in the second communication apparatus group, and the feedback information indicates that there is at least one second communication apparatus that fails to correctly receive the first information and that is in the second communication apparatus group.

The method may be executed by a first communication apparatus. The first communication apparatus may be, for example, a network device in wireless communication, a primary node in a communication domain, an access point (AP) in a local wireless communication system, a module (like a chip) in a network device, a module (like a chip) in a primary node, or a module (like a chip) in an access point.

Based on this solution, the first communication apparatus may simultaneously detect, on the first time-frequency resource, the feedback information sent by the second communication apparatuses in the second communication apparatus group. In other words, the second communication apparatuses in the second communication apparatus group send the feedback information to the first communication apparatus by using the same first time-frequency resource. This helps reduce resources occupied by the feedback information. Especially when there is a large quantity of second communication apparatuses in the second communication apparatus group, feedback efficiency can be improved as much as possible by using limited resources.

Further, optionally, a second communication apparatus that fails to correctly receive the first information and that is in the second communication apparatus group sends the feedback information to the first communication apparatus, and a second communication apparatus that correctly receives the feedback information does not send the feedback information. This helps reduce interference between the feedback information of different second communication apparatuses.

In a possible implementation, the first communication apparatus may send first configuration information that indicates the first time-frequency resource.

The first configuration information is sent, so that the first time-frequency resource used by the second communication apparatus in the second communication apparatus group to send the feedback information can be indicated, thereby helping improve resource scheduling flexibility.

In a possible implementation, the first communication apparatus may receive capability information of at least one second communication apparatus in the second communication apparatus group.

The capability information from the second communication apparatus is received, so that a proper first time-frequency resource can be determined based on the received capability information, to implement capability-based resource configuration.

In a possible implementation, when the feedback information from the at least one second communication apparatus is detected on the first time-frequency resource, the method further includes that the first communication apparatus sends second information, where the second information is the same as the first information, or the second information is generated based on original information corresponding to the first information.

The second information is sent, so that a second communication apparatus that fails to correctly receive the first information can re-obtain original information sent by the first communication apparatus, thereby helping improve reliability of receiving a multicast signal by the second communication apparatus. Further, when the second information is different from the first information, the first information and the second information are generated based on same original information. For example, a new modulation and coding scheme (MCS) is used to process the original information to obtain the second information. In this way, receiving accuracy of the second communication apparatus can be improved as much as possible, and communication performance can be improved.

In a possible implementation, a symbol rate used for transmitting the feedback information is less than a symbol rate used for transmitting the first information.

A small symbol rate used for transmitting feedback information helps prolong a time period in which the second communication apparatus sends the feedback information, thereby helping reduce inter-symbol interference caused by multipath and/or incomplete synchronization of signals that carry feedback information and that are sent by different second communication apparatuses. Therefore, accuracy of detecting the feedback information by the first communication apparatus can be improved.

In a possible implementation, the signal that carries the feedback information includes one or more sequences. At least one of the one or more sequences is predefined or preconfigured, or is obtained according to a predefined rule, or is obtained according to a predefined and/or preconfigured parameter and a predefined rule.

In a possible implementation, the one or more sequences include a sequence obtained based on any one or any combination of an m-sequence, a Gold sequence, a preamble sequence, a sequence of a first identifier of the second communication apparatus, or a sequence of an identifier of a link. Alternatively, the one or more sequences may be a sequence of any one or any combination of the foregoing sequences.

When the signal that carries the feedback information includes a sequence obtained based on the m-sequence, because the m-sequence has good autocorrelation characteristics and cross-correlation characteristics, the m-sequence can effectively prevent interference and noise, so that reliability of detecting the feedback information by the first communication apparatus can be improved.

When the signal that carries the feedback information includes a sequence obtained based on the preamble sequence, because the preamble sequence enables the first communication apparatus to quickly obtain power of the signal that carries the feedback information and that is sent by the second communication apparatus, automatic gain control (AGC) adjustment and another function can be completed as soon as possible, for example, determining a frequency used by a code element at a transmit end and estimating a time sequence.

In a possible implementation, the one or more sequences include the preamble sequence, and the preamble sequence is at a start location of the one or more sequences.

In a possible implementation, when the one or more sequences include the sequence obtained based on the m-sequence, the m-sequences corresponding to the different second communication apparatuses in the second communication apparatus group are different, or shifts of the m-sequences corresponding to the different second communication apparatuses in the second communication apparatus group are different.

Different second communication apparatuses in the second communication apparatus group correspond to different m-sequences or shifts of the m-sequences, that is, signals that carry the feedback information and that are sent by the different second communication apparatuses in the second communication apparatus group are different. In this way, reverse cancellation caused by channel impact can be reduced, so that the first communication apparatus cannot detect the signal that carries the feedback information. In addition, the first communication apparatus can accurately determine a specific second communication apparatus that fails to correctly receive the first information.

When the shifts of the m-sequences corresponding to the different second communication apparatuses in the second communication apparatus group are different, the signal that carries the feedback information includes at least two consecutive m-sequences with the same shifts.

The two consecutive m-sequences with the same shifts are used, so that the first communication apparatus may delay correlation by using one m-sequence, that is, the first communication apparatus may detect existence of the feedback information. Implementation is simple.

In a possible implementation, the one or more sequences of the signal that carries the feedback information include N sub-sequences, where N is an integer greater than 1. Any one of the N sub-sequences is used as an example, that is, an $i^{th}$ sub-sequence is used as an example. The $i^{th}$ sub-sequences corresponding to the different second communication apparatuses in the second communication apparatus group have a same length and a same start location in the one or more sequences. The $i^{th}$ sub-sequence meets $A^i \times b_i$, where $b_i$ is an $i^{th}$ complex number in a complex sequence whose length is N and that is obtained based on a second identifier of the second communication apparatus, and $A^i$ is an $i^{th}$ common complex sequence in a common complex sequence set. The different second communication apparatuses in the second communication apparatus group correspond to a same common complex sequence set.

The $i^{th}$ sub-sequences corresponding to the different second communication apparatuses in the second communication apparatus group have a same length and a same start location in the one or more sequences, so that $A_i \times b_i$ that the $i^{th}$ sub-sequences in the signals that are sent by the different second communication apparatuses and that carry the feedback information meet can be aligned. When second identifiers of different second communication apparatuses are different, at least one complex number in complex sequences whose lengths are N and that correspond to the different second communication apparatuses is different. This helps avoid a case in which the first communication apparatus cannot detect the feedback information due to reverse cancellation in a specific superposition manner.

In a possible implementation, the first communication apparatus may further send third configuration information, where the third configuration information indicates a value of N.

The third configuration information is sent to indicate the value of the length N of the complex sequence. This helps avoid a waste of resources caused by an excessively long signal that carries the feedback information. In addition, the first communication apparatus properly configures the value of N, so that the different second identifiers can correspond to different complex sequences whose lengths are N. In this way, the different second communication apparatuses correspond to different complex sequences whose lengths are N.

In a possible implementation, the common complex sequence set is predefined or preconfigured.

In a possible implementation, the $i^{th}$ common complex sequence may include a phase-modulated first bit sequence, or may include the preamble sequence and the phase-modulated first bit sequence, where the first bit sequence includes at least one of the m-sequence, the Gold sequence, or a sequence of an identifier of the second communication apparatus group.

Further, optionally, when the $i^{th}$ common complex sequence includes the preamble sequence and the phase-modulated first bit sequence, the preamble sequence is located before the phase-modulated first bit sequence. It may alternatively be understood as the following. The $i^{th}$ common complex sequence sequentially includes the predefined preamble sequence and the phase-modulated first bit sequence.

In a possible implementation, the first communication apparatus may further send second configuration information, where the second configuration information includes information about a second identifier of at least one second communication apparatus in the second communication apparatus group.

The second configuration information is sent, so that the first communication apparatus can configure the second identifier for the at least one second communication apparatus in the second communication apparatus group. Further, the first communication apparatus may configure different second identifiers for different second communication apparatuses based on the second configuration information. This helps reduce reverse cancellation caused by channel impact, so that the first communication apparatus cannot detect the signal that carries the feedback information. In addition, because different second communication apparatuses correspond to different second identifiers, the first communication apparatus can accurately determine a specific second communication apparatus that fails to correctly receive the first information.

In a possible implementation, different second communication apparatuses in the second communication apparatus group correspond to one or more same sequences.

Different second communication apparatuses in the second communication apparatus group correspond to one or more same sequences, so that implementation is simple, and a configuration process is simplified.

Further, optionally, when the one or more sequences include the sequence obtained based on the m-sequence, m-sequences corresponding to the different second communication apparatuses in the second communication apparatus group are the same, or shifts of m-sequences corresponding to the different second communication apparatuses in the second communication apparatus group are the same.

In a possible implementation, the method further includes that the first communication apparatus sends first indication information, where the first indication information indicates at least one sequence in the one or more sequences corresponding to the second communication apparatus.

Further, optionally, when the at least one sequence includes the sequence obtained based on the m-sequence, the first indication information further indicates a sequence that corresponds to the second communication apparatus and that is obtained based on the m-sequence or a shift of the m-sequence.

According to a second aspect, this disclosure provides a communication method. The method may include detecting first information, and when the first information is not correctly received, sending feedback information to a first communication apparatus on a first time-frequency resource, where the first time-frequency resource is a feedback resource used for any second communication apparatus in a second communication apparatus group that includes at least two second communication apparatuses, that is, the second communication apparatus may send the feedback information on the first time-frequency resource, and the feedback information indicates a second communication apparatus that fails to correctly receive the first information and that is in the second communication apparatuses in the second communication apparatus group.

The method may be performed by the second communication apparatus. The second communication apparatus may be, for example, a terminal device in wireless communication, a secondary node in a communication domain, a station in a wireless communication system, a module (like a chip) in a terminal device, a module (like a chip) in a secondary node, or a module (like a chip) in a station.

Based on this solution, the second communication apparatuses in the second communication apparatus group send the feedback information to the first communication apparatus by using the same first time-frequency resource. This helps reduce resources occupied by the feedback information. Especially when there is a large quantity of second communication apparatuses in the second communication apparatus group, feedback efficiency can be improved as much as possible by using limited resources.

Further, a second communication apparatus that fails to correctly receive the first information and that is in the second communication apparatus group sends the feedback information to the first communication and a second communication apparatus that correctly receives the feedback information does not send the feedback information. This helps reduce interference between the feedback information of different second communication apparatuses.

In a possible implementation, the method may further include that the second communication apparatus receives first configuration information from the first communication apparatus, where the first configuration information indicates the first time-frequency resource.

The second communication apparatus may obtain, based on the received first configuration information, the first time-frequency resource used for sending the feedback information, thereby helping improve resource scheduling flexibility.

In a possible implementation, the method may further include that the second communication apparatus sends capability information of the second communication apparatus to the first communication apparatus.

The capability information is sent to the first communication apparatus, so that the first communication apparatus can determine a proper first time-frequency resource based on the capability information, to implement capability-based resource configuration.

In a possible implementation, the method may further include that the second communication apparatus receives second information from the first communication apparatus, where the second information is the same as the first information, or the second information and the first information correspond to same original information.

The second information is received, so that a second communication apparatus that fails to correctly receive the first information can re-obtain original information sent by the first communication apparatus, thereby helping improve reliability of receiving a multicast signal by the second communication apparatus. Further, when the second information is different from the first information, the first information and the second information are generated based on same original information. For example, a new MCS is used to process the original information to obtain the second information. In this way, receiving accuracy of the second communication apparatus can be improved as much as possible, and communication performance can be improved.

In a possible implementation, a symbol rate used for transmitting the feedback information is less than a symbol rate used for transmitting the first information.

A small symbol rate used for transmitting feedback information helps prolong a time period in which the second communication apparatus sends the feedback information, thereby helping reduce inter-symbol interference caused by multipath and/or incomplete synchronization of signals that carry feedback information and that are sent by different second communication apparatuses. Therefore, accuracy of detecting the feedback information by the first communication apparatus can be improved.

In a possible implementation, the signal that carries the feedback information includes one or more sequences. At least one of the one or more sequences is predefined or preconfigured, or is obtained according to a predefined rule, or is obtained according to a predefined and/or preconfigured parameter and a predefined rule.

In a possible implementation, the one or more sequences include a sequence obtained based on any one or any combination of an m-sequence, a Gold sequence, a preamble sequence, a sequence of a first identifier of the second communication apparatus, or a sequence of an identifier of a link. Alternatively, the one or more sequences may be a sequence of any one or any combination of the foregoing sequences.

When the signal that carries the feedback information includes a sequence obtained based on the m-sequence, because the m-sequence has good autocorrelation characteristics and cross-correlation characteristics, the m-sequence can effectively prevent interference and noise, so that reliability of detecting the feedback information by the first communication apparatus can be improved.

When the signal that carries the feedback information includes a sequence obtained based on the preamble sequence, because the preamble sequence enables the first communication apparatus to quickly obtain power of the signal that carries the feedback information and that is sent by the second communication apparatus, AGC adjustment and another function can be completed as soon as possible, for example, determining a frequency used by a code element at a transmit end and estimating a time sequence.

In a possible implementation, the one or more sequences include the preamble sequence, and the preamble sequence is at a start location of the one or more sequences.

In a possible implementation, a different second communication apparatus in the second communication apparatus group corresponds to at least one different sequence in the one or more sequences.

In a possible implementation, when the one or more sequences include the m-sequence, the m-sequences corresponding to the different second communication apparatuses in the second communication apparatus group are different, or shifts of the m-sequences corresponding to the different second communication apparatuses in the second communication apparatus group are different.

Different second communication apparatuses in the second communication apparatus group correspond to different m-sequences or shifts of the m-sequences, that is, signals that carry the feedback information and that are sent by the different second communication apparatuses in the second communication apparatus group are different. In this way, reverse cancellation caused by channel impact can be reduced, so that the first communication apparatus cannot detect the signal that carries the feedback information. In addition, the first communication apparatus can accurately determine a specific second communication apparatus that fails to correctly receive the first information.

Further, optionally, when the shifts of the m-sequences corresponding to the different second communication apparatuses in the second communication apparatus group are different, the signal that carries the feedback information includes at least two consecutive m-sequences with the same shifts.

The two consecutive m-sequences with the same shifts are used, so that the first communication apparatus may delay correlation by using one m-sequence, that is, the first communication apparatus may detect existence of the feedback information. Implementation is simple.

In a possible implementation, the one or more sequences include N sub-sequences, where N is an integer greater than 1. Any one of the N sub-sequences is used as an example, that is, an $i^{th}$ sub-sequence is used as an example. The $i^{th}$ sub-sequences corresponding to the different second communication apparatuses in the second communication apparatus group have a same length and a same start location in the one or more sequences. The $i^{th}$ sub-sequence meets $A^i \times b_i$, where $b_i$ is an $i^{th}$ complex number in a complex sequence whose length is N and that is obtained based on a second identifier of the second communication apparatus, and $A^i$ is an $i^{th}$ common complex sequence in a common complex sequence set. The different second communication apparatuses in the second communication apparatus group correspond to a same common complex sequence set.

The $i^{th}$ sub-sequences corresponding to the different second communication apparatuses in the second communication apparatus group have a same length and a same start location in the one or more sequences, so that $A^i \times b_i$ that the $i^{th}$ sub-sequences in the signals that are sent by the different second communication apparatuses and that carry the feedback information meet can be aligned. When second identifiers of different second communication apparatuses are different, at least one complex number in complex sequences whose lengths are N and that correspond to the different second communication apparatuses is different. This helps avoid a case in which the first communication apparatus cannot detect the feedback information due to reverse cancellation in a specific superposition manner.

In a possible implementation, the common complex sequence set is predefined or configured.

In a possible implementation, the $i^{th}$ common complex sequence may include a phase-modulated first bit sequence, or may include the preamble sequence and the phase-modulated first bit sequence, where the first bit sequence includes at least one of the m-sequence, the Gold sequence, or a sequence of an identifier of the second communication apparatus group.

Further, optionally, when the $i^{th}$ common complex sequence includes the preamble sequence and the phase-modulated first bit sequence, the preamble sequence is located before the phase-modulated first bit sequence. It may alternatively be understood as the following. The $i^{th}$ common complex sequence sequentially includes the predefined preamble sequence and the phase-modulated first bit sequence.

In a possible implementation, the method may further include that the second communication apparatus receives second configuration information from the first communication apparatus, where the second configuration information includes information about a second identifier of the second communication apparatus.

The second communication apparatus may obtain the second identifier by receiving the second configuration information. That the different second communication apparatuses in the second communication apparatus group obtain different second identifiers helps reduce reverse cancellation caused by channel impact, so that the first communication apparatus cannot detect the signal that carries the feedback information. In addition, because different second communication apparatuses correspond to different second identifiers, the first communication apparatus can accurately determine a specific second communication apparatus that fails to correctly receive the first information.

In a possible implementation, the second communication apparatus may alternatively randomly generate the second identifier of the second communication apparatus.

In a possible implementation, the method further includes that the second communication apparatus receives third configuration information from the first communication apparatus, where the third configuration information indicates a value of N.

The second communication apparatus may obtain, based on the third configuration information, the length N of the complex sequence. This helps avoid a waste of resources caused by an excessively long signal that carries the feedback information. In addition, the first communication apparatus properly configures the value of N, so that the different second identifiers can correspond to different complex sequences whose lengths are N. In this way, the different second communication apparatuses correspond to different complex sequences whose lengths are N.

In a possible implementation, different second communication apparatuses in the second communication apparatus group correspond to one or more same sequences.

In a possible implementation, when the one or more sequences include the m-sequence, m-sequences corresponding to the different second communication apparatuses in the second communication apparatus group are the same, or shifts of m-sequences corresponding to the different second communication apparatuses in the second communication apparatus group are the same.

Different second communication apparatuses in the second communication apparatus group correspond to one or more same sequences, so that implementation is simple, and a configuration process is simplified.

In a possible implementation, the method further includes that the second communication apparatus receives first indication information from the first communication apparatus, where the first indication information indicates at least one sequence in the one or more sequences corresponding to the second communication apparatus.

In a possible implementation, when the at least one sequence includes the sequence obtained based on the m-sequence, the first indication information further indicates a sequence that corresponds to the second communication apparatus and that is obtained based on the m-sequence or a shift of the m-sequence.

According to a third aspect, this disclosure provides a communication apparatus. The communication apparatus is configured to implement the method in the first aspect or any one implementation of the first aspect, or is configured to implement the method in the second aspect or any one implementation of the second aspect. The communication apparatus includes corresponding functional modules, respectively configured to implement the steps in the foregoing method. Functions may be implemented by hardware, or may be implemented by hardware executing corresponding software. The hardware or software includes one or more modules corresponding to the foregoing functions.

In a possible implementation, the communication apparatus may be a first communication apparatus (for example, a network device), or may be a component, for example, a chip, a chip system, or a circuit, that can be used in a first communication apparatus. For beneficial effects, refer to the descriptions in the first aspect. Details are not described herein again. The communication apparatus may include a transceiver and a processor. The processor may be configured to support the communication apparatus in performing a corresponding function of the first communication apparatus shown above. The transceiver is configured to support communication between the communication apparatus and another communication apparatus (for example, a second communication apparatus). The transceiver may be an independent receiver, an independent transmitter, a transceiver integrating receiving and sending functions, or an interface circuit. Optionally, the communication apparatus may further include a memory. The memory may be coupled to the processor, and stores program instructions and data that are necessary for the communication apparatus.

In a possible implementation, the communication apparatus may be an information processing apparatus, or the communication apparatus includes an information processing apparatus.

The transceiver is configured to send first information to a second communication apparatus group including at least two second communication apparatuses. The processor is configured to detect, on a first time-frequency resource, feedback information from at least one second communication apparatus in the second communication apparatus group, where the first time-frequency resource is a feedback resource used for any second communication apparatus in the second communication apparatus group, and the feedback information indicates that there is at least one second communication apparatus that fails to correctly receive the first information and that is in the second communication apparatus group.

In a possible implementation, the transceiver is further configured to send first configuration information that indicates the first time-frequency resource.

In a possible implementation, the transceiver is further configured to receive capability information of at least one second communication apparatus in the second communication apparatus group.

In a possible implementation, when the feedback information from the at least one second communication apparatus is detected on the first time-frequency resource, the transceiver is further configured to send second information, where the second information is the same as the first information, or the second information is generated based on original information corresponding to the first information.

In a possible implementation, a symbol rate used for transmitting the feedback information is less than a symbol rate used for transmitting the first information.

In a possible implementation, the signal that carries the feedback information includes one or more sequences. At least one of the one or more sequences is predefined or preconfigured, or is obtained according to a predefined rule, or is obtained according to a predefined and/or preconfigured parameter and a predefined rule.

In a possible implementation, the one or more sequences include a sequence obtained based on any one or any combination of an m-sequence, a Gold sequence, a preamble sequence, a sequence of a first identifier of the second communication apparatus, or a sequence of an identifier of a link.

In a possible implementation, the one or more sequences include the preamble sequence, and the preamble sequence is at a start location of the one or more sequences.

In a possible implementation, when the one or more sequences include the sequence obtained based on the m-sequence, the m-sequences corresponding to the different second communication apparatuses in the second communication apparatus group are different, or shifts of the m-sequences corresponding to the different second communication apparatuses in the second communication apparatus group are different.

Further, optionally, when the shifts of the m-sequences corresponding to the different second communication apparatuses in the second communication apparatus group are different, the signal that carries the feedback information includes at least two consecutive m-sequences with the same shifts.

In a possible implementation, the one or more sequences of the signal that carries the feedback information include N sub-sequences, where N is an integer greater than 1. Any one of the N sub-sequences is used as an example, that is, an $i^{th}$ sub-sequence is used as an example. The $i^{th}$ sub-sequences corresponding to the different second communication apparatuses in the second communication apparatus group have a same length and a same start location in the one or more sequences. The $i^{th}$ sub-sequence meets $A^i \times b_i$, where $b_i$ is an $i^{th}$ complex number in a complex sequence whose length is N and that is obtained based on a second identifier of the second communication apparatus, and $A^i$ is an $i^{th}$ common complex sequence in a common complex sequence set. The different second communication apparatuses in the second communication apparatus group correspond to a same common complex sequence set.

In a possible implementation, the transceiver is further configured to send third configuration information, where the third configuration information indicates N.

In a possible implementation, the $i^{th}$ common complex sequence is a predefined or preconfigured common complex sequence. It may alternatively be understood as the following. The common complex sequence set is predefined or configured.

In a possible implementation, the $i^{th}$ common complex sequence may include a phase-modulated first bit sequence, or may include the preamble sequence and the phase-modulated first bit sequence, where the first bit sequence includes at least one of the m-sequence, the Gold sequence, or a sequence of an identifier of the second communication apparatus group.

Further, optionally, when the $i^{th}$ common complex sequence includes the preamble sequence and the phase-modulated first bit sequence, the preamble sequence is located before the phase-modulated first bit sequence. It may alternatively be understood as the following. The $i^{th}$ common complex sequence sequentially includes the predefined preamble sequence and the phase-modulated first bit sequence.

In a possible implementation, the transceiver is further configured to send second configuration information, where the second configuration information includes information about a second identifier of at least one second communication apparatus in the second communication apparatus group.

In a possible implementation, different second communication apparatuses in the second communication apparatus group correspond to one or more same sequences.

Further, optionally, when the one or more sequences include the sequence obtained based on the m-sequence, m-sequences corresponding to the different second communication apparatuses in the second communication apparatus group are the same, or shifts of m-sequences corresponding to the different second communication apparatuses in the second communication apparatus group are the same.

In a possible implementation, the transceiver is further configured to send first indication information, where the first indication information indicates at least one sequence in the one or more sequences corresponding to the second communication apparatus.

Further, optionally, when the at least one sequence includes the sequence obtained based on the m-sequence, the first indication information further indicates a sequence that corresponds to the second communication apparatus and that is obtained based on the m-sequence or a shift of the m-sequence.

In a possible implementation, the communication apparatus may be a second communication apparatus (for example, a terminal device), or may be a module, for example, a chip, a chip system, or a circuit, that can be used in a second communication apparatus. For beneficial effects, refer to the descriptions in the second aspect. Details are not described herein again. The communication apparatus may include a transceiver and a processor. The processor may be configured to support the communication apparatus in performing a corresponding function of the second communication apparatus shown above. The transceiver is configured to support communication between the communication apparatus and another communication apparatus (for example, the first communication apparatus) or the like. The transceiver may be an independent receiver, an independent transmitter, a transceiver integrating receiving and sending functions, or an interface circuit. Optionally, the communication apparatus may further include a memory. The memory may be coupled to the processor, and stores program instructions and data that are necessary for the communication apparatus.

The processor is configured to detect the first information. When the first information is not correctly received, the transceiver is configured to send feedback information to a first communication apparatus on a first time-frequency resource, where the first time-frequency resource is a feedback resource used for any second communication apparatus in a second communication apparatus group that includes at least two second communication apparatuses, and the feedback information indicates that a second communication apparatus in the second communication apparatus group fails to correctly receive the first information.

In a possible implementation, the transceiver is further configured to receive first configuration information from the first communication apparatus, where the first configuration information indicates the first time-frequency resource.

In a possible implementation, the transceiver is further configured to send capability information of the second communication apparatus to the first communication apparatus.

In a possible implementation, the transceiver is further configured to receive second information from the first communication apparatus, where the second information is the same as the first information, or the second information and the first information correspond to same original information.

In a possible implementation, a symbol rate used for transmitting the feedback information is less than a symbol rate used for transmitting the first information.

In a possible implementation, the signal that carries the feedback information includes one or more sequences. At least one of the one or more sequences is predefined or preconfigured, or is obtained according to a predefined rule, or is obtained according to a predefined and/or preconfigured parameter and a predefined rule.

In a possible implementation, the one or more sequences include a sequence obtained based on any one or any combination of an m-sequence, a Gold sequence, a preamble sequence, a sequence of a first identifier of the second communication apparatus, or a sequence of an identifier of a link.

In a possible implementation, the one or more sequences include the preamble sequence, and the preamble sequence is at a start location of the one or more sequences.

In a possible implementation, a different second communication apparatus in the second communication apparatus group corresponds to at least one different sequence in the one or more sequences.

In a possible implementation, when the one or more sequences include the sequence obtained based on the m-sequence, the m-sequences corresponding to the different second communication apparatuses in the second communication apparatus group are different, or shifts of the m-sequences corresponding to the different second communication apparatuses in the second communication apparatus group are different.

In a possible implementation, the one or more sequences include N sub-sequences, where N is an integer greater than 1. Any one of the N sub-sequences is used as an example, that is, an $i^{th}$ sub-sequence is used as an example. The $i^{th}$ sub-sequences corresponding to the different second communication apparatuses in the second communication apparatus group have a same length and a same start location in the one or more sequences. The $i^{th}$ sub-sequence meets $A^i \times b_i$, where $b_i$ is an $i^{th}$ complex number in a complex sequence whose length is N and that is obtained based on a second identifier of the second communication apparatus, and $A^i$ is an $i^{th}$ common complex sequence in a common complex sequence set. The different second communication apparatuses in the second communication apparatus group correspond to a same common complex sequence set.

In a possible implementation, the common complex sequence set is predefined or configured.

In a possible implementation, the $i^{th}$ common complex sequence may include a phase-modulated first bit sequence, or may include the preamble sequence and the phase-modulated first bit sequence, where the first bit sequence includes at least one of the m-sequence, the Gold sequence, or a sequence of an identifier of the second communication apparatus group.

Further, optionally, when the $i^{th}$ common complex sequence includes the preamble sequence and the phase-modulated first bit sequence, the preamble sequence is located before the phase-modulated first bit sequence. It may alternatively be understood as the following. The $i^{th}$ common complex sequence sequentially includes the predefined preamble sequence and the phase-modulated first bit sequence.

In a possible implementation, the transceiver is further configured to receive second configuration information from the first communication apparatus, where the second configuration information includes information about a second identifier of the second communication apparatus.

In a possible implementation, the processor is configured to randomly generate the second identifier of the second communication apparatus.

In a possible implementation, the transceiver is further configured to receive third configuration information from the first communication apparatus, where the third configuration information indicates a value of N.

In a possible implementation, different second communication apparatuses in the second communication apparatus group correspond to one or more same sequences.

In a possible implementation, when the one or more sequences include the sequence obtained based on the m-sequence, m-sequences corresponding to the different second communication apparatuses in the second communication apparatus group are the same, or shifts of m-sequences corresponding to the different second communication apparatuses in the second communication apparatus group are the same.

In a possible implementation, the transceiver is further configured to receive the first indication information from the first communication apparatus, where the first indication information indicates at least one sequence in the one or more sequences corresponding to the second communication apparatus.

In a possible implementation, when the at least one sequence includes the sequence obtained based on the m-sequence, the first indication information further indicates a sequence that corresponds to the second communication apparatus and that is obtained based on the m-sequence or a shift of the m-sequence.

According to a fourth aspect, this disclosure provides a communication apparatus. The communication apparatus is configured to implement the method in the first aspect or any one implementation of the first aspect, or is configured to implement the method in the second aspect or any one implementation of the second aspect. The communication apparatus includes corresponding functional modules, respectively configured to the steps in the foregoing method. Functions may be implemented by hardware, or may be implemented by hardware executing corresponding software. The hardware or software includes one or more modules corresponding to the foregoing functions.

In a possible implementation, the communication apparatus may alternatively be a first communication apparatus (like a network device). The communication apparatus may include a transceiver module and a processing module. These modules may perform corresponding functions of the first communication apparatus in the foregoing method example.

In a possible implementation, the communication apparatus may be an information processing apparatus, or the communication apparatus includes an information processing apparatus.

The transceiver module is configured to send first information to a second communication apparatus group including at least two second communication apparatus. The processing module is configured to detect, on a first time-frequency resource, feedback information from at least one second communication apparatus in the second communication apparatus group, where the first time-frequency resource is a feedback resource used for any second communication apparatus in the second communication apparatus group, and the feedback information indicates that there is at least one second communication apparatus that fails to correctly receive the first information and that is in the second communication apparatus group.

In a possible implementation, the transceiver module is further configured to send first configuration information that indicates the first time-frequency resource.

In a possible implementation, the transceiver module is further configured to receive capability information of at least one second communication apparatus in the second communication apparatus group.

In a possible implementation, when the feedback information from the at least one second communication apparatus is detected on the first time-frequency resource, the transceiver module is further configured to send second information, where the second information is the same as the first information, or the second information is generated based on original information corresponding to the first information.

In a possible implementation, a symbol rate used for transmitting the feedback information is less than a symbol rate used for transmitting the first information.

In a possible implementation, the signal that carries the feedback information includes one or more sequences. At least one of the one or more sequences is predefined or preconfigured, or is obtained according to a predefined rule, or is obtained according to a predefined and/or preconfigured parameter and a predefined rule.

In a possible implementation, the one or more sequences include a sequence obtained based on any one or any combination of an m-sequence, a Gold sequence, a preamble sequence, a sequence of a first identifier of the second communication apparatus, or a sequence of an identifier of a link.

In a possible implementation, the one or more sequences include the preamble sequence, and the preamble sequence is at a start location of the one or more sequences.

In a possible implementation, when the one or more sequences include the sequence obtained based on the m-sequence, the m-sequences corresponding to the different second communication apparatuses in the second communication apparatus group are different, or shifts of the m-sequences corresponding to the different second communication apparatuses in the second communication apparatus group are different.

Further, optionally, when the shifts of the m-sequences corresponding to the different second communication apparatuses in the second communication apparatus group are different, the signal that carries the feedback information includes at least two consecutive m-sequences with the same shifts.

The two consecutive m-sequences with the same shifts are used, so that the first communication apparatus may delay correlation by using one m-sequence, that is, the first communication apparatus may detect existence of the feedback information. Implementation is simple.

In a possible implementation, the one or more sequences of the signal that carries the feedback information include N sub-sequences, where N is an integer greater than 1. Any one of the N sub-sequences is used as an example, that is, an $i^{th}$ sub-sequence is used as an example. The $i^{th}$ sub-sequences corresponding to the different second communication apparatuses in the second communication apparatus group have a same length and a same start location in the one or more sequences. The $i^{th}$ sub-sequence meets $A^i \times b_i$, where $b_i$ is an $i^{th}$ complex number in a complex sequence whose length is N and that is obtained based on a second identifier of the second communication apparatus, and $A^i$ is an $i^{th}$ common complex sequence in a common complex sequence set. The different second communication apparatuses in the second communication apparatus group correspond to a same common complex sequence set.

In a possible implementation, the transceiver module is further configured to send third configuration information, where the third configuration information indicates N.

In a possible implementation, the common complex sequence set is predefined or configured.

In a possible implementation, the $i^{th}$ common complex sequence may include a phase-modulated first bit sequence, or may include the preamble sequence and the phase-modulated first bit sequence, where the first bit sequence includes at least one of the m-sequence, the Gold sequence, or a sequence of an identifier of the second communication apparatus group.

Further, optionally, when the $i^{th}$ common complex sequence includes the preamble sequence and the phase-modulated first bit sequence, the preamble sequence is located before the phase-modulated first bit sequence. It may alternatively be understood as the following. The $i^{th}$ common complex sequence sequentially includes the predefined preamble sequence and the phase-modulated first bit sequence.

In a possible implementation, the transceiver module is further configured to send second configuration information, where the second configuration information includes information about a second identifier of at least one second communication apparatus in the second communication apparatus group.

In a possible implementation, different second communication apparatuses in the second communication apparatus group correspond to one or more same sequences.

Further, optionally, when the one or more sequences include the sequence obtained based on the m-sequence, m-sequences corresponding to the different second communication apparatuses in the second communication apparatus group are the same, or shifts of m-sequences corresponding to the different second communication apparatuses in the second communication apparatus group are the same.

In a possible implementation, the transceiver module is further configured to send first indication information, where the first indication information indicates at least one sequence in the one or more sequences corresponding to the second communication apparatus.

Further, optionally, when the at least one sequence includes the sequence obtained based on the m-sequence, the first indication information indicates a sequence that corresponds to the second communication apparatus and that is obtained based on the m-sequence or a shift of the m-sequence.

In another possible implementation, the communication apparatus may be the second communication apparatus (for example, a terminal device). The communication apparatus may include a processing module and a transceiver module. These modules may perform corresponding functions of the second communication apparatus in the foregoing method example.

The transceiver module is configured to detect the first information. The transceiver module coordinates with the processing module, and is further configured to, when the first information is not correctly received, send feedback information on a first time-frequency resource, where the first time-frequency resource is a feedback resource used for any second communication apparatus in a second communication apparatus group that includes at least two second communication apparatuses, and the feedback information indicates that there is at least one second communication apparatus that fails to correctly receive the first information and that is in the second communication apparatus group.

In a possible implementation, the transceiver module is further configured to receive first configuration information from the first communication apparatus, where the first configuration information indicates the first time-frequency resource.

In a possible implementation, the transceiver module is further configured to send capability information.

In a possible implementation, the transceiver module is further configured to receive second information from the first communication apparatus, where the second information is the same as the first information, or the second information and the first information correspond to same original information.

In a possible implementation, a symbol rate used for transmitting the feedback information is less than a symbol rate used for transmitting the first information.

In a possible implementation, the signal that carries the feedback information includes one or more sequences. At least one of the one or more sequences is predefined or preconfigured, or is obtained according to a predefined rule, or is obtained according to a predefined and/or preconfigured parameter and a predefined rule.

In a possible implementation, the one or more sequences include a sequence obtained based on any one or any combination of an m-sequence, a Gold sequence, a preamble sequence, a sequence of a first identifier of the second communication apparatus, or a sequence of an identifier of a link.

In a possible implementation, the one or more sequences include the preamble sequence, and the preamble sequence is at a start location of the one or more sequences.

In a possible implementation, a different second communication apparatus in the second communication apparatus group corresponds to at least one different sequence in the one or more sequences.

In a possible implementation, when the one or more sequences include the sequence obtained based on the m-sequence, the m-sequences corresponding to the different second communication apparatuses in the second communication apparatus group are different, or shifts of the m-sequences corresponding to the different second communication apparatuses in the second communication apparatus group are different.

In a possible implementation, the one or more sequences include N sub-sequences, where N is an integer greater than 1. Any one of the N sub-sequences is used as an example, that is, an $i^{th}$ sub-sequence is used as an example. The $i^{th}$ sub-sequences corresponding to the different second communication apparatuses in the second communication apparatus group have a same length and a same start location in the one or more sequences. The $i^{th}$ sub-sequence meets $A^i \times b_i$, where $b_i$ is an $i^{th}$ complex number in a complex sequence whose length is N and that is obtained based on a second identifier of the second communication apparatus, and $A^i$ is an $i^{th}$ common complex sequence in a common complex sequence set. The different second communication apparatuses in the second communication apparatus group correspond to a same common complex sequence set.

In a possible implementation, the common complex sequence set is predefined or configured.

In a possible implementation, the $i^{th}$ common complex sequence may include a phase-modulated first bit sequence, or may include the preamble sequence and the phase-modulated first bit sequence, where the first bit sequence includes at least one of the m-sequence, the Gold sequence, or a sequence of an identifier of the second communication apparatus group.

Further, optionally, when the $i^{th}$ common complex sequence includes the preamble sequence and the phase-modulated first bit sequence, the preamble sequence is located before the phase-modulated first bit sequence. It may alternatively be understood as the following. The $i^{th}$ common complex sequence sequentially includes the predefined preamble sequence and the phase-modulated first bit sequence.

In a possible implementation, the transceiver module is further configured to receive second configuration information from the first communication apparatus, where the second configuration information includes information about a second identifier of the second communication apparatus.

In a possible implementation, the processing module is configured to randomly generate the second identifier of the second communication apparatus.

In a possible implementation, the transceiver module is further configured to receive third configuration information from the first communication apparatus, where the third configuration information indicates a value of N.

In a possible implementation, different second communication apparatuses in the second communication apparatus group correspond to one or more same sequences.

In a possible implementation, when the one or more sequences include the sequence obtained based on the m-sequence, m-sequences corresponding to the different second communication apparatuses in the second communication apparatus group are the same, or shifts of m-sequences corresponding to the different second communication apparatuses in the second communication apparatus group are the same.

In a possible implementation, the transceiver module is further configured to receive the first indication information from the first communication apparatus, where the first indication information indicates at least one sequence in the one or more sequences corresponding to the second communication apparatus.

In a possible implementation, when the at least one sequence includes the sequence obtained based on the m-sequence, the first indication information further indicates a sequence that corresponds to the second communication apparatus and that is obtained based on the m-sequence or a shift of the m-sequence.

According to a fifth aspect, this disclosure provides a communication system. The communication system includes a first communication apparatus and a second communication apparatus group. The first communication apparatus may be configured to perform the method in the first aspect or any implementation of the first aspect, and the second communication apparatus in the second communication apparatus group may be configured to perform the method in the second aspect or any implementation of the second aspect. Alternatively, the communication system may include a primary node and a secondary node. The primary node may be configured to perform the method in the first aspect or any implementation of the first aspect, and the secondary node may be configured to perform the method in the second aspect or any implementation of the second aspect.

According to a sixth aspect, this disclosure provides a chip. The chip includes at least one processor and an interface circuit. The chip is configured to perform the method in the first aspect or any implementation of the first aspect, or is configured to perform the method in the second aspect or any implementation of the second aspect.

According to a seventh aspect, this disclosure provides a terminal device. The terminal device may include the communication apparatus in the fourth aspect or any implementation of the fourth aspect, or may include the communication apparatus in the fifth aspect or any implementation of the fifth aspect.

According to an eighth aspect, this disclosure provides a computer-readable storage medium. The computer-readable storage medium stores a computer program or instructions. When the computer program is executed or the instructions are executed by a communication apparatus, the communication apparatus is enabled to perform the method in the first aspect or any possible implementation of the first aspect, or the communication apparatus is enabled to perform the method in the second aspect or any possible implementation of the second aspect.

According to a ninth aspect, this disclosure provides a computer program product. The computer program product includes a computer program or instructions. When the computer program is executed or the instructions are executed by a communication apparatus, the communication apparatus is enabled to perform the method in the first aspect or any possible implementation of the first aspect, or the communication apparatus is enabled to perform the method in the second aspect or any possible implementation of the second aspect.

DESCRIPTION OF EMBODIMENTS

The following describes in detail embodiments of this disclosure with reference to accompanying drawings.

Figure 1:
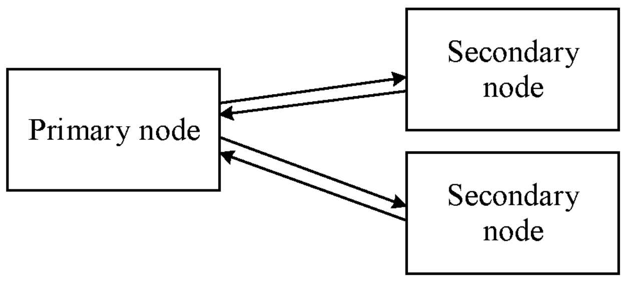
FIG. 1 is a schematic diagram of an architecture of a communication system according to this disclosure.

FIG. 1 is a schematic diagram of an architecture of a communication system to which this disclosure is applicable. The communication system may include a primary node and at least one secondary node. In FIG. 1, an example in which two secondary nodes are included is used. The primary node and each secondary node may communicate with each other in a wireless or wired manner. The primary node and the secondary node may be understood as two types of communication apparatuses that have a communication function and that are distinguished from each other in terms of logical functions. In a possible example, the primary node and the secondary node are in a same communication domain. The primary node may manage a resource (for example, a time domain resource or a frequency domain resource) in a communication domain, and has a function of scheduling a resource for a communication link between the primary node and the secondary node. The secondary node follows scheduling performed by the primary node, and uses a time-frequency resource allocated by the primary node to communicate with the primary node. The primary node may send same information, namely, multicast information, to a plurality of secondary nodes.

Information transmitted between the primary node and the secondary node may include service data (like multicast data), signaling, and some signals. The signaling may include, for example, physical layer signaling or higher layer signaling. The signal may include, for example, a signal having one or more functions, like a synchronization signal, a reference signal, a channel estimation signal, a channel sounding signal, a phase tracking signal, or a positioning signal.

The architecture of the communication system shown in FIG. 1 may be applied to a wide-area wireless communication scenario (refer to FIG. 2A below). For example, the scenario may include communication between a network device and a plurality of terminal devices. Alternatively, the architecture of the communication system may be applied to a local wireless communication scenario (refer to FIG. 2B below). For example, the scenario may include communication between an AP and a plurality of stations or the like. Alternatively, the architecture of the communication system may be applied to an in-vehicle wireless communication scenario (refer to FIG. 2C below). For example, the scenario may include communication between a head unit (for example, an automobile cockpit domain controller (CDC)) and a sound box, a microphone, a display, a mobile phone, or the like. For another example, the scenario may include communication between a mobile phone and a wearable device like a headset. For another example, the scenario may include communication between a passive entry passive start (PEPS) system and a mobile phone key or a vehicle key.

Figure 2A:
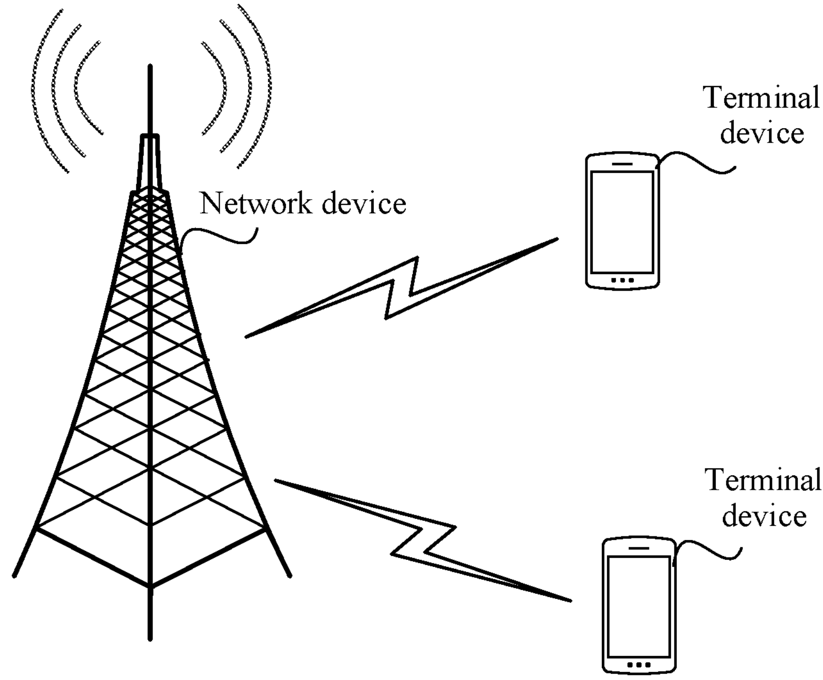
FIG. 2A is a schematic diagram of a possible application scenario according to this disclosure.

FIG. 2A is a schematic diagram of a possible application scenario according to this disclosure. An example in which the application scenario includes one network device and two terminal devices is used. The terminal device communicates with the network device in a wireless manner. The network device may be used as a primary node, and the two terminal devices are used as secondary nodes. The network device may allocate a time-frequency resource to the terminal device, and the terminal device follows scheduling performed by the network device.

The network device is an access device through which the terminal device accesses the communication system in a wireless manner and may provide a wireless communication function for the terminal device. The network device may be a base station, an evolved NodeB (eNodeB), a transmission (sending and reception) point (transmission reception point (TRP)), a next generation NodeB (gNB) in a fifth generation (5G) communication system, a base station in a future communication system, an access node in a WI-FI system, or the like, or the network device may be a module or a unit that completes a part of a function of a base station, for example, may be a central unit (CU) or a distributed unit (DU). A specific technology and a specific device form that are used by the network device are not limited in embodiments of this disclosure.

The terminal device may also be referred to as a terminal, a user equipment (UE), a mobile station, a mobile terminal, or the like. The terminal device may be a mobile phone, a tablet computer, a computer having a wireless transceiver function, a virtual reality terminal device, an augmented reality terminal device, a wireless terminal in industrial control, a wireless terminal in self-driving, a wireless terminal in remote surgery, a wireless terminal in a smart grid, a wireless terminal in transportation safety, a wireless terminal in a smart city, a wireless terminal in a smart home, or the like. A specific technology and a specific device form that are used for the terminal device are not limited in this disclosure.

Figure 2B:
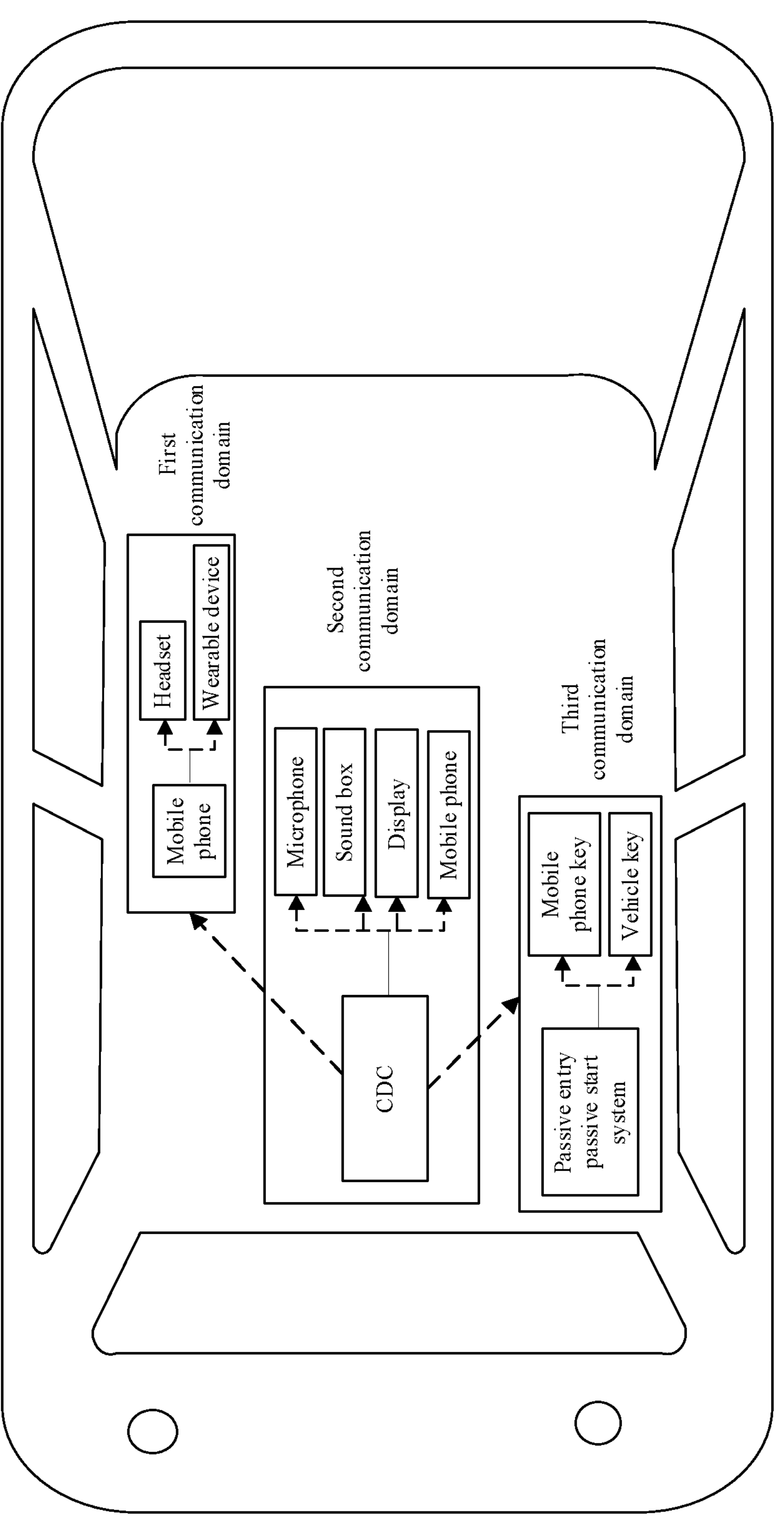
FIG. 2B is a schematic diagram of a wireless communication scenario in an intelligent terminal according to this disclosure.

FIG. 2B is a schematic diagram of a wireless communication scenario, namely, another possible application scenario, in an intelligent terminal according to this disclosure. The intelligent terminal may be, for example, a vehicle. The vehicle includes but is not limited to an unmanned vehicle, an intelligent vehicle (like an automated guided vehicle (AGV)), an electric vehicle, a digital vehicle, an intelligent manufacturing vehicle, and the like. There is a plurality of communication domains in the in-vehicle wireless communication scenario, and one communication domain may include one primary node and at least one secondary node. In FIG. 2B, a mobile phone, a headset, and a wearable device are in one communication domain, for example, referred to as a first communication domain, where the mobile phone is used as a primary node, and the headset and the wearable device are used as secondary nodes. A CDC, a display, a microphone, a sound box and a mobile phone are in one communication domain, for example, referred to as a second communication domain, where the CDC is used as a primary node, and the display, the microphone, the sound box, and the mobile phone are used as secondary nodes. A PEPS system, a mobile phone key, and a vehicle key are in one communication domain, for example, referred to as a third communication domain, where the PEPS system is used as a primary node, and the mobile phone key and the vehicle key are used as secondary nodes. It should be understood that when the vehicle is divided into a plurality of communication domains, there may be a plurality of factors based on which division is performed. For example, division may be performed based on functions implemented by vehicle-mounted devices. Further, if several vehicle-mounted devices cooperate with each other to implement a function (for example, a power function), these vehicle-mounted devices may be grouped into one communication domain. For another example, division may be performed based on spatial locations of the vehicle-mounted devices in the vehicle. For another example, division may be performed based on factors such as the spatial locations of the vehicle-mounted devices in the vehicle and a function cooperatively completed by the vehicle-mounted devices. For another example, the communication domain may alternatively be obtained through dividing from a perspective of a resource. For example, a resource that is allocated by a node and that is used by the node to communicate with another node may be referred to as a communication domain. In this case, the node is a primary node in the communication domain, and the other node that communicates with the node by using the communication domain (resource) is a secondary node in the communication domain. It should be understood that the communication domain shown in FIG. 2B is merely an example. In addition, each communication domain may further include another vehicle-mounted device. For example, the third communication domain may further include a body control module (BCM) and the like.

It should be noted that a primary node in a communication domain may also be used as a secondary node in another communication domain. For example, the mobile phone in the first communication domain may be used as a secondary node in the second communication domain.

Figure 2C:
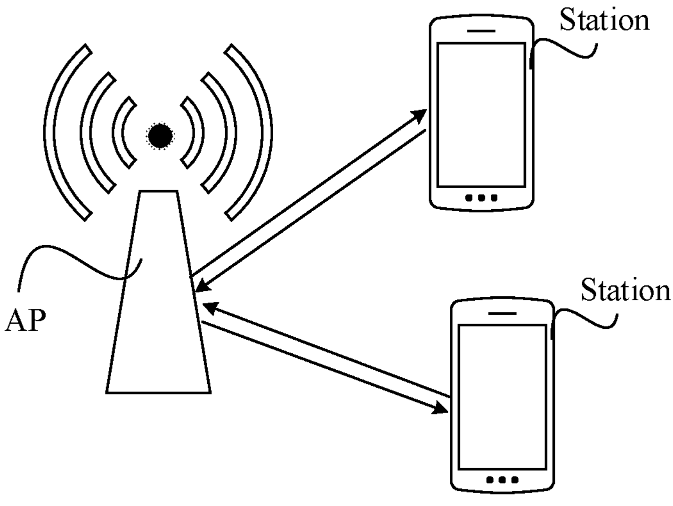
FIG. 2C is a schematic diagram of a local wireless communication scenario according to this disclosure.

FIG. 2C is a schematic diagram of a local wireless communication scenario according to this disclosure. An example in which the application scenario includes one AP and two stations is used. The AP is used as a primary node, and the station is used as a secondary node. The station may access the AP by using WI-FI. In FIG. 2C, an example in which the station is a mobile phone is used.

Figure 2D:
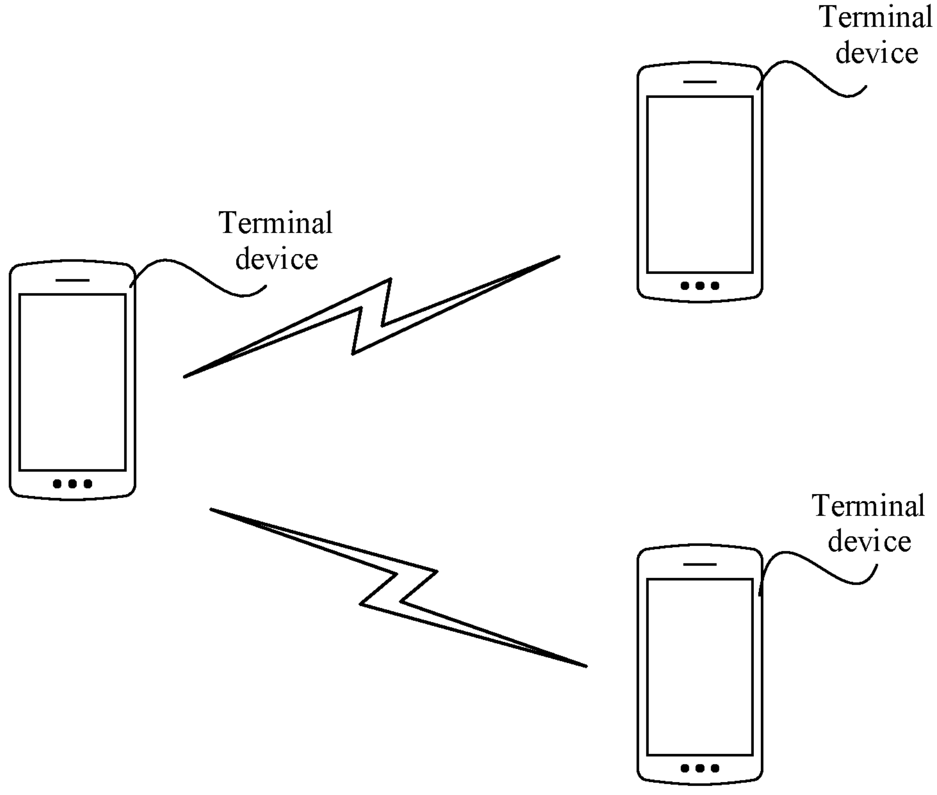
FIG. 2D is a schematic diagram of a sidelink communication scenario according to this disclosure.

It should be noted that the foregoing system architecture and application scenario are merely examples for description, and do not constitute a limitation on the technical solutions provided in this disclosure. For example, the system architecture shown in FIG. 1 may be further applied to a vehicle-to-everything (V2X) communication scenario. Refer to FIG. 2D. The three terminal devices may communicate with each other through a sidelink (SL). In this scenario, a terminal device configured to schedule resources may be used as a primary node, and a terminal device configured to follow resource scheduling may be used as a secondary node.

Based on the foregoing content, the primary node sends information to the secondary node, and this process is considered as a downlink transmission process, and the secondary node sends information to the primary node, and this process is considered as an uplink transmission process. In addition, a primary node in a communication domain having a highest priority sends information to a primary node in another communication domain, where the process may also be considered as a downlink transmission process (in this case, the primary node in the other communication domain may be considered as joining the communication domain having the highest priority, and is used as a secondary node in the communication domain), and the primary node in the other communication domain sends information to the primary node in the communication domain having the highest priority, where the process may also be considered as an uplink transmission process (in this case, the primary node in the other communication domain may also be considered as joining the communication domain having the highest priority, and is used as a secondary node in the communication domain). It should be noted that uplink generally refers to a direction in which a terminal (T) node sends data or information to a grant (G) node, and may be represented by "T". Downlink generally refers to a direction in which the G node sends information to the T node, and may be represented by "G". It may alternatively be understood as the following: "G" represents downlink transmission, and "T" represents uplink transmission. This is merely an example. Alternatively, "U" represents uplink transmission, and "D" represents downlink transmission.

To resolve the technical problem mentioned in the background, this disclosure provides a communication method. In the method, when failing to correctly receive first information sent by a first communication apparatus, a second communication apparatus may send feedback information on a unified first time-frequency resource. Compared with the conventional technology in which each second communication apparatus in a second communication apparatus group separately sends feedback information on a different time-frequency resource, this method can save feedback resources. Therefore, feedback efficiency can be improved as much as possible on limited feedback resources.

Based on the foregoing content, the following describes the communication method provided in this disclosure with reference to FIG. 3 to FIG. 8.

The method may be performed by the first communication apparatus and the second communication apparatus in the second communication apparatus group. The first communication apparatus may be the primary node shown in FIG. 1, and the second communication apparatus may be the secondary node shown in FIG. 1. The two secondary nodes may form the second communication apparatus group. Alternatively, the first communication apparatus may be the network device shown in FIG. 2A, and the second communication apparatuses may be the two terminal devices shown in FIG. 2A. The two terminal devices may form the second communication apparatus group. Alternatively, the first communication apparatus may be the AP in FIG. 2B, and the second communication apparatuses may be the stations in FIG. 2B. The two stations may form the second communication apparatus group. Alternatively, the first communication apparatus may be the mobile phone in the first communication domain shown in FIG. 2C, and the second communication apparatuses may be the headset and the wearable device in the first communication domain shown in FIG. 2C. The headset and the wearable device may form the second communication apparatus group. Alternatively, the first communication apparatus may be the CDC in the second communication domain shown in FIG. 2C, and the second communication apparatuses may be the display, the microphone, the sound box, and the mobile phone in the second communication domain shown in FIG. 2C. The display, the microphone, the sound box, and the mobile phone may form the second communication apparatus group. Alternatively, the first communication apparatus may be the PEPS system in the third communication domain shown in FIG. 2C, and the second communication apparatuses may be the mobile phone key and the vehicle key in the third communication domain shown in FIG. 2C. The mobile phone key and the vehicle key may form the second communication apparatus group. Alternatively, the first communication apparatus may be the terminal device configured to schedule a resource in FIG. 2D, and the second communication apparatuses may be the terminal devices configured to follow the resource scheduling in FIG. 2D. The terminal devices configured to follow the resource scheduling may form the second communication apparatus group.

In a possible implementation, the first communication apparatus may send, in a unicast manner, configuration signaling to the second communication apparatuses that need to form the second communication apparatus group. The configuration signaling includes but is not limited to one or more of an identifier of the second communication apparatus group, an identifier of the second communication apparatus, or information about a resource used for communication between the first communication apparatus and the second communication apparatus group. For example, the resource used for communication between the first communication apparatus and the second communication apparatus group may be a multicast resource used by the first communication apparatus to send multicast information to the second communication apparatus, or the like.

Figures 3, 4, 5:
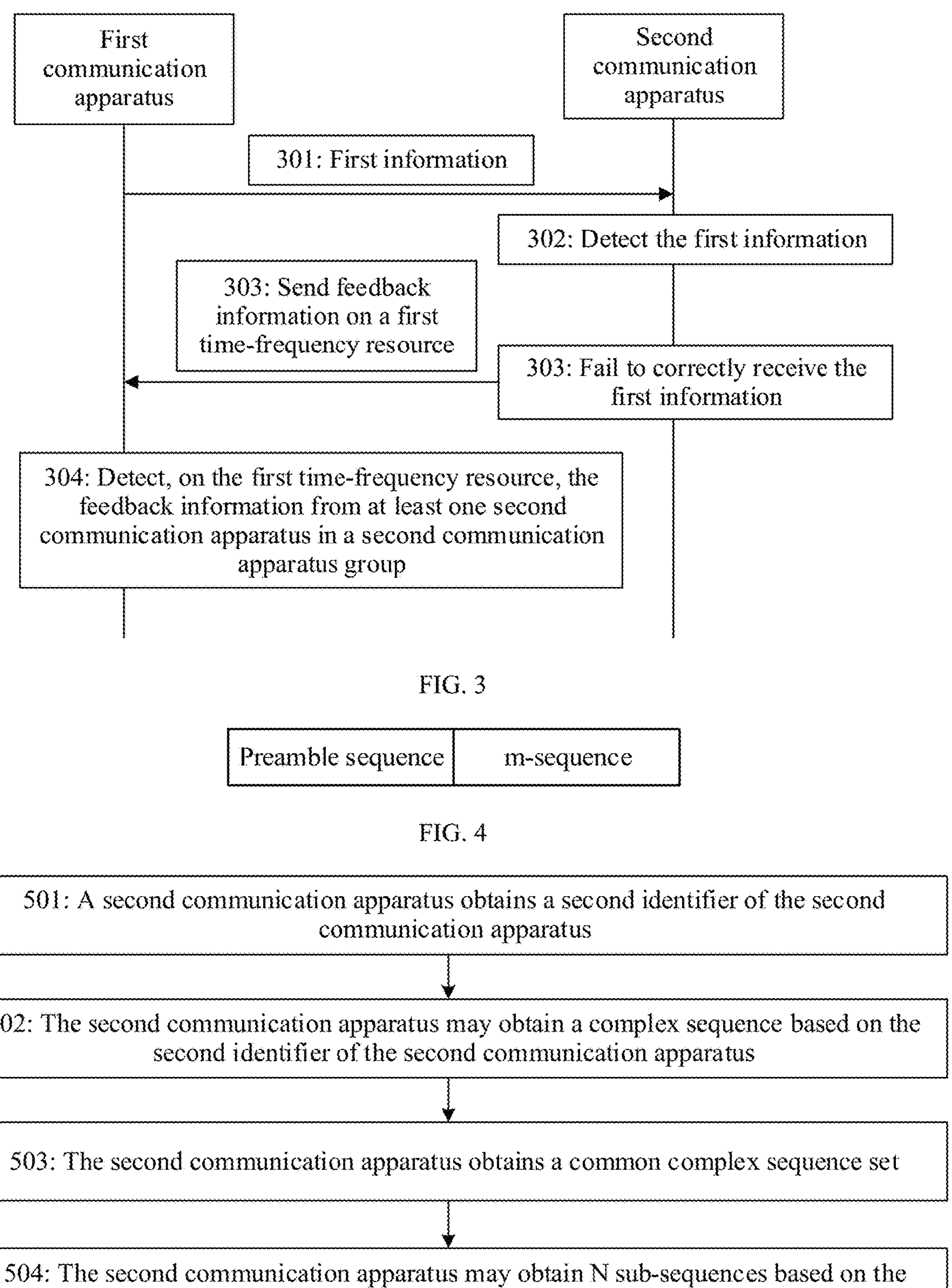
FIG. 3 is a schematic flowchart of a communication method according to this disclosure.
FIG. 4 is a schematic diagram of a location relationship between a preamble sequence and an m-sequence that correspond to one or more signals carrying feedback information according to this disclosure.
FIG. 5 is a schematic flowchart of a method for obtaining N sub-sequences by a second communication apparatus according to this disclosure.

In the following, FIG. 3 is a schematic flowchart of a communication method according to this disclosure. In the method, a second communication apparatus group may include at least two second communication apparatuses. The method may include the following steps.

Step 301: A first communication apparatus sends first information to the second communication apparatus group.

Further, the first communication apparatus may send the first information in a multicast manner, that is, the first communication apparatus may send the first information to the second communication apparatus group, where the first information may be multicast information. In a possible implementation, before sending the first information, the first communication apparatus may send a configuration signal to each second communication apparatus in the second communication apparatus group, where the configuration signal includes a multicast resource for sending the first information. Further, the first communication apparatus sends the first information on the multicast resource. Correspondingly, the second communication apparatus may detect the first information on the multicast resource. For example, the first information may be multicast service data, or may be signaling (like physical layer signaling or higher layer signaling), or may include at least one signal (for example, a synchronization signal, a reference signal, a channel estimation signal, a channel sounding signal, a phase tracking signal, and/or a positioning signal).

In a possible implementation, the first communication apparatus may modulate and encode original information, to obtain the first information.

Step 302: The second communication apparatus detects the first information.

In a possible implementation, the at least two second communication apparatuses in the second communication apparatus group detect the first information from the first communication apparatus on a corresponding multicast resource. It may be understood as the following. The at least two second communication apparatuses in the second communication apparatus group attempt to receive the first information from the first communication apparatus on the corresponding multicast resource. Based on this, the second communication apparatus may receive the first information, or may not receive the first information.

Step 303: When failing to correctly receive the first information, the second communication apparatus sends feedback information on a first time-frequency resource.

Herein, the first time-frequency resource is a feedback resource used for any second communication apparatus in the second communication apparatus group. It may alternatively be understood as the following. All feedback resources used by the second communication apparatuses in the second communication apparatus group to send the feedback information are the first time-frequency resources. In other words, all second communication apparatuses in the second communication apparatus group occupy a same frequency domain resource and a same time domain resource when sending the feedback information to the first communication apparatus.

With reference to FIG. 1, both feedback resources used by the two secondary nodes in the second communication apparatus group to send feedback information to the primary node are the first time-frequency resources. With reference to FIG. 2A, both feedback resources used by the two terminal devices in the second communication apparatus group to send feedback information to the network device are the first time-frequency resources. With reference to FIG. 2B, both feedback resources used by the two stations in the second communication apparatus group to send feedback information to the AP are the first time-frequency resources. With reference to FIG. 2C, in the first communication domain, feedback resources used by the headset and the wearable device in the second communication apparatus group to send feedback information to the mobile phone are the first time-frequency resources. Alternatively, in the second communication domain, all feedback resources used by the display, the microphone, the sound box, and the mobile phone in the second communication apparatus group to send feedback information to the CDC are the first time-frequency resources. Alternatively, in the third communication domain, both feedback resources used by the mobile phone key and the vehicle key in the second communication apparatus group to send feedback information to the PEPS system are the first time-frequency resources.

Figure 6:
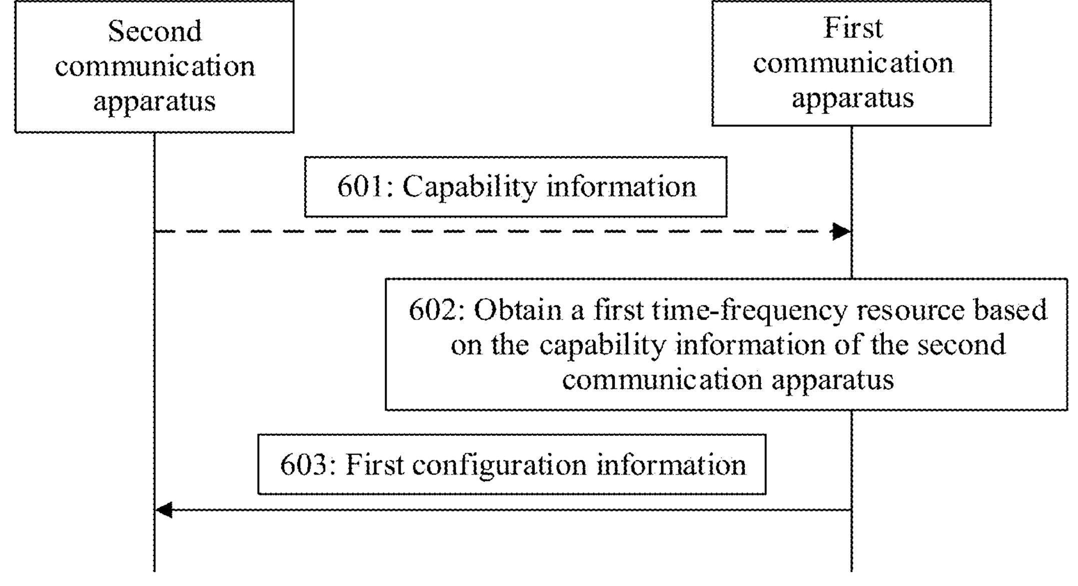
FIG. 6 is a schematic flowchart of a method for obtaining a first time-frequency resource by a second communication apparatus according to this disclosure.

In a possible implementation, the second communication apparatus may obtain the first time-frequency resource based on the following method shown in FIG. 6, or the first time-frequency resource may be predefined in a protocol, or the first time-frequency resource may be pre-agreed on by the first communication apparatus and the second communication apparatus. This is not limited in this disclosure.

Herein, the feedback information indicates that there is at least one second communication apparatus that fails to correctly receive the first information and that is in the second communication apparatus group. It should be noted that failing to correctly receive the first information includes but is not limited to failing to demodulate and decode the first information, failing to receive the first information sent by the first communication apparatus, or the like.

For example, the feedback information may be, for example, a NACK character, or may be other information that indicates that the first information is not correctly received. It should be noted that a specific form of the feedback information may be specified by the first communication apparatus and notified by the first communication apparatus to the second communication apparatus, or may be pre-agreed on by the first communication apparatus and the second communication apparatus, or may be predefined in a protocol. This is not limited in this disclosure.

In a possible implementation, when the second communication apparatus sends the feedback information to the first communication apparatus, a signal may be used to carry the feedback information. For the signal that carries the feedback information, refer to the following related descriptions. Details are not described herein again.

In a possible implementation, a second communication apparatus that fails to correctly receive the first information in the second communication apparatus group may send feedback information to the first communication apparatus on a same time-frequency resource (namely, the first time-frequency resource), and a second communication apparatus that correctly receives the first information may not send any signal.

In a possible implementation, a symbol rate used for transmitting the feedback information is less than a symbol rate used for transmitting the first information. The symbol rate may also be referred to as a transmission bit rate or an element transmission rate. A unit of the symbol rate is symbol per second (sps). It may alternatively be understood as the following. Duration in which the second communication apparatus sends each symbol of the feedback information is greater than duration in which the first communication apparatus sends each symbol of the first information. In this way, duration for sending the feedback information by the second communication apparatus can be prolonged, thereby helping reduce inter-symbol interference caused by channel multipath and/or incomplete synchronization of feedback information sent by different second communication apparatuses, and further helping improve accuracy of detecting the feedback information by the first communication apparatus.

Step 304: The first communication apparatus may detect, on the first time-frequency resource, feedback information from at least one second communication apparatus in the second communication apparatus group.

It may alternatively be understood as the following. The first communication apparatus attempts to receive the feedback information from the second communication apparatus group on the first time-frequency resource. Based on this, the first communication apparatus may receive the feedback information, or may not receive the feedback information from the second communication apparatus group.

In a possible implementation, the first communication apparatus may receive, on the first time-frequency resource, a signal that carries the feedback information. In a possible scenario, the signal that carries the feedback information is a superposition of signals that carry the feedback information and that are sent by all or some second communication apparatuses failing to correctly receive the first information. In another possible scenario, the signal that carries the feedback information may alternatively be feedback information sent by a second communication apparatus in the second communication apparatus group, and other feedback information may be missed in detection or may not be received due to another reason.

In the foregoing step 301 to step 304, the second communication apparatuses in the second communication apparatus group send the feedback information to the first communication apparatus by using the same first time-frequency resource. This helps reduce resources occupied by the feedback information, especially when there is a large quantity of second communication apparatuses in the second communication apparatus group. Further, only a second communication apparatus that fails to correctly receive the first information in the second communication apparatus group sends the feedback information, thereby helping reduce interference between feedback information of different second communication apparatuses.

In the foregoing step 304, when the first communication apparatus receives the feedback information from the second communication apparatus group on the first time-frequency resource, it indicates that there is at least one second communication apparatus that fails to correctly receive the first information and that is in the second communication apparatus group.

In a possible implementation, the first communication apparatus may send second information. The second information may be the same as the first information, that is, the first communication apparatus may resend the first information. Alternatively, the second information may be generated based on original information corresponding to the first information. For example, the second information may be information obtained after an MCS for the original information is changed.

Further, optionally, if the first communication apparatus may determine specific second communication apparatuses that fail to correctly receive the first information, the first communication apparatus may send, in a unicast manner, the second information to the second communication apparatuses that fail to correctly receive the first information. Correspondingly, the second communication apparatus that fails to correctly receive the first information may detect the second information from the first communication apparatus. Alternatively, the first communication apparatus may send the second information to the second communication apparatus group in a multicast manner. Correspondingly, at least two second communication apparatuses in the second communication apparatus group detect the second information on a corresponding multicast resource. It should be noted that, for a manner in which the first communication apparatus may obtain the specific second communication apparatuses in the second communication apparatus group that fail to correctly receive the first information, refer to the following description of case 2. Details are not described herein again.

If the first communication apparatus cannot determine specific second communication apparatuses that fail to correctly receive the first information, the first communication apparatus may send the second information to the second communication apparatus group in a multicast manner. Correspondingly, at least two second communication apparatuses in the second communication apparatus group detect the second information on a corresponding multicast resource. Alternatively, the second information may be sent to each or at least one second communication apparatus in the second communication apparatus group in a unicast manner, so that each second communication apparatus in the second communication apparatus group can correctly receive the second information as much as possible.

The following describes in detail a signal that carries feedback information.

In a possible implementation, the signal that carries the feedback information may include one or more sequences. Some or all of the one or more sequences of the signal that carries the feedback information may be predefined (for example, specified in a protocol, specified in a regulation, or specified in an industry standard) or preconfigured (for example, the sequence may be configured by using signaling transmitted before the sequence is transmitted, and the sequence may be configured for a sending node and a receiving node of the sequence by using a wireless communication technology or another technology other than the wireless communication technology, where the other technology is, for example, a wired communication technology, or by using a configuration interface, a configuration jumper, configuration software, or the like reserved by the sending node and the receiving node), for example, a sequence obtained based on an m-sequence and/or a Gold sequence. Alternatively, some or all sequences of the one or more sequences of the signal that carries the feedback information may be obtained according to a predefined rule (for example, a generation rule like a protocol, a regulation, or an industry standard that specifies the sequence, and a sending node and a receiving node of the sequence may generate the sequence according to the rule), for example, a sequence (or referred to as a preamble) obtained based on a preamble sequence. Further, optionally, the preamble sequence may further indicate one or more of a frequency used by an element of the second communication apparatus, time sequence estimation, configuration automatic gain control, a symbol rate, synchronization, and the like. The preamble sequence generally uses a fixed "01" sequence, for example, "010101 . . . " or "101010 . . . ". Alternatively, some or all sequences of the one or more sequences of the signal that carries the feedback information may be obtained according to a predefined rule based on a predefined and/or preconfigured parameter, for example, a sequence of a first identifier of the second communication apparatus or a sequence of an identifier of a link. For a specific process of obtaining the sequence of the first identifier of the second communication apparatus, refer to the following description of situation 4. For a specific process of obtaining the sequence of the identifier of the link, refer to the following description of situation 5. Alternatively, some or all of the one or more sequences of the signal that carries the feedback information may be obtained by combining sequences obtained in at least one of the foregoing manners according to a predefined combination rule. According to the combination rule herein, sorting may be performed according to a predefined sequence, or numbers in a plurality of sequences may be calculated and rearranged according to a predefined rule. For example, numbers in a predefined sequence are sequentially multiplied by a predefined spreading/time spreading sequence, and are arranged in an order, to obtain the signal that carries the feedback information.

It should be noted that the sequence includes numbers whose length and arrangement sequence are predetermined. A type of the number may be, for example, a bit "0" or a bit "1", a real number, a complex number, or an integer. For example, the sequence may be a "01" string including a bit "0" and a bit "1", or may be a real number string including real numbers, or may be a complex number string including complex numbers, or may be an integer string including integers.

It should be understood that the receiving node and the sending node may obtain the sequence (or a sequence set) in advance, that is, may obtain in advance a length of the sequence of the signal that carries the feedback information, an arrangement order of numbers, and the like. For example, before the signal that carries the feedback information is transmitted, a manner in which the first communication apparatus and the second communication apparatus in the second communication apparatus group have obtained the one or more sequences of the signal that carries the feedback information includes but is not limited to the foregoing determining manners.

In a possible implementation, the one or more sequences of the signal that carries the feedback information may include a sequence obtained based on any one or any combination of the m-sequence, the Gold sequence, the preamble sequence, the sequence of the first identifier of the second communication apparatus, and the sequence of the identifier of the link (where the m-sequence, the Gold sequence, the preamble sequence, the sequence of the first identifier of the second communication apparatus, and the sequence of the identifier of the link may be referred to as basic sequences or original sequences), or may be a sequence of any one or any combination of the foregoing sequences. Further, optionally, the one or more sequences of the signal that carries the feedback information may be obtained by performing phase modulation on any one of the m-sequence, the Gold sequence, the preamble sequence, the sequence of the identifier of the second communication apparatus, or the sequence of the identifier of the link. For example, the one or more sequences of the signal that carries the feedback information may be a signal that carries the feedback information and that is obtained by performing phase modulation on the m-sequence, and, for another example, may be a signal that carries the feedback information and that is obtained by performing phase modulation on the Gold sequence. Alternatively, the one or more sequences of the signal that carries the feedback information may be obtained by performing phase modulation on any one of an encoded m-sequence, an encoded Gold sequence, an encoded preamble sequence, an encoded sequence of the identifier of the second communication apparatus, and an encoded sequence of the identifier of the link. For example, the one or more sequences of the signal that carries the feedback information may be a signal that carries the feedback information and that is obtained by performing phase modulation on the encoded m-sequence, and, for another example, may be a signal that carries the feedback information and that is obtained by performing phase modulation on the encoded Gold sequence. Alternatively, the one or more sequences of the signal that carries the feedback information may be obtained by separately performing phase modulation on any more of the m-sequence, the Gold sequence, the preamble sequence, the sequence of the identifier of the second communication apparatus, and the sequence of the identifier of the link, and combining (for example, combining according to a preset combination rule) phase-modulated sequences. For example, the one or more sequences of the signal that carries the feedback information may be a signal that carries the feedback information and that is obtained by separately performing phase modulation on the m-sequence and the Gold sequence and then combining a phase-modulated m-sequence and a phase-modulated Gold sequence according to a preset combination rule, and, for another example, may be a signal that carries the feedback information and that is obtained by separately performing phase modulation on the m-sequence and the preamble sequence and then combining a phase-modulated m-sequence and a phase-modulated preamble sequence according to a preset combination rule. Alternatively, the one or more sequences of the signal that carries the feedback information may be obtained by separately performing phase modulation on any more of an encoded m-sequence, an encoded Gold sequence, an encoded preamble sequence, an encoded sequence of the identifier of the second communication apparatus, and an encoded sequence of the identifier of the link, and then combining encoded and phase-modulated sequences according to a preset combination rule. For example, the one or more sequences of the signal that carries the feedback information may be a signal that carries the feedback information and that is obtained by performing phase modulation on the encoded m-sequence and the encoded Gold sequence, and then combining an encoded and phase-modulated m-sequence and an encoded and phase-modulated Gold sequence according to a preset combination rule. This is not limited in this disclosure.

It should be noted that phase modulation is used as an example for description in the foregoing example. A modulation manner of the m-sequence, the Gold sequence, the preamble sequence, the sequence of the identifier of the second communication apparatus, and the sequence of the identifier of the link is not limited in this disclosure. For example, the modulation manner may alternatively be amplitude modulation, frequency modulation, quadrature amplitude modulation, or the like.

It may alternatively be understood as the following. The one or more sequences forming the signal that carries the feedback information may be obtained based on different sequences. The following provides descriptions in cases.

Situation 1: The one or more sequences of the signal that carries the feedback information are obtained based on the m-sequence.

In a possible implementation, the one or more sequences of the signal that carries the feedback information may be obtained by modulating the m-sequence. In other words, a sequence obtained by modulating the m-sequence is the signal that carries the feedback information.

In another possible implementation, the one or more sequences of the signal that carries the feedback information may alternatively be obtained by modulating an encoded m-sequence. In other words, a sequence obtained by modulating the encoded m-sequence is the signal that carries the feedback information.

Based on situation 1, when failing to correctly receive the first information, the second communication apparatus sends, to the first communication apparatus, the sequence obtained based on the m-sequence (namely, the signal that carries the feedback information). For example, the second communication apparatus may pre-generate the m-sequence, and when determining that the second communication apparatus fails to correctly receive the first information, the second communication apparatus modulates the m-sequence to obtain a modulated m-sequence, and sends the modulated m-sequence to the first communication apparatus. For another example, the second communication apparatus may pre-store or pre-obtain a modulated m-sequence, and when failing to correctly receive the first information, the second communication apparatus may send the modulated m-sequence to the first communication apparatus. It should be understood that the signal provided herein that carries the feedback information and that is obtained by the second communication apparatus based on the m-sequence is merely an example. This is not limited in this disclosure.

Correspondingly, when receiving, from the second communication apparatus group, the signal that carries the feedback information, the first communication apparatus may determine that there is at least one second communication apparatus that fails to correctly receive the first information and that is in the second communication apparatus group.

It should be understood that the m-sequence is easy to generate, has a strong regularity, and has good autocorrelation characteristics and cross-correlation characteristics. Therefore, the m-sequence can effectively resist interference and noise. In this way, reliability of detecting feedback information by the first communication apparatus can be improved.

Situation 2: The one or more sequences of the signal that carries the feedback information are obtained based on the Gold sequence.

Herein, the Gold sequence is a code sequence based on the m-sequence, has good autocorrelation characteristics and cross-correlation characteristics, and generates a large quantity of sequences.

In a possible implementation, the one or more sequences of the signal that carries the feedback information may be obtained by modulating the Gold sequence or by modulating an encoded Gold sequence. It may alternatively be understood as the following. A sequence obtained by modulating the Gold sequence or by modulating the encoded Gold sequence is the signal that carries the feedback information.

Based on situation 2, when failing to correctly receive the first information, the second communication apparatus sends, to the first communication apparatus, the sequence obtained based on the Gold sequence (namely, the signal that carries the feedback information). For example, the second communication apparatus may pre-generate the Gold sequence, and when determining that the second communication apparatus fails to correctly receive the first information, the second communication apparatus modulates the Gold sequence to obtain a modulated Gold sequence, and sends the modulated Gold sequence to the first communication apparatus. For another example, the second communication apparatus may pre-store or pre-obtain a modulated Gold sequence, and when failing to correctly receive the first information, the second communication apparatus may send the modulated Gold sequence to the first communication apparatus. It should be understood that the signal provided herein that carries the feedback information and that is obtained by the second communication apparatus based on the Gold sequence is merely an example. This is not limited in this disclosure.

Correspondingly, when detecting, from the second communication apparatus group, the signal that carries the feedback information, the first communication apparatus may determine that at least one second communication apparatus in the second communication apparatus group fails to correctly receive the first information.

Situation 3: The one or more sequences of the signal that carries the feedback information are obtained based on the preamble sequence.

In a possible implementation, the one or more sequences of the signal that carries the feedback information may be obtained by modulating the preamble sequence, or may be obtained by modulating an encoded preamble sequence. In other words, a sequence obtained by modulating the preamble sequence or by modulating the encoded preamble sequence is the signal that carries the feedback information.

Based on situation 3, when failing to correctly receive the first information, the second communication apparatus sends, to the first communication apparatus, the sequence obtained based on the preamble sequence (namely, the signal that carries the feedback information). For example, the second communication apparatus may pre-generate the preamble sequence, and when determining that the second communication apparatus fails to correctly receive the first information, the second communication apparatus modulates the preamble sequence to obtain a modulated preamble sequence, and sends the modulated preamble sequence to the first communication apparatus. For another example, the second communication apparatus may pre-store or pre-obtain a modulated preamble sequence, and when failing to correctly receive the first information, the second communication apparatus may send the modulated preamble sequence to the first communication apparatus. It should be understood that the signal provided herein that carries the feedback information and that is obtained by the second communication apparatus based on the preamble sequence is merely an example. This is not limited in this disclosure.

Correspondingly, when detecting, from the second communication apparatus group, the signal that carries the feedback information, the first communication apparatus may determine that at least one second communication apparatus in the second communication apparatus group fails to correctly receive the first information.

Situation 4: The one or more sequences of the signal that carries the feedback information are obtained based on the sequence of the first identifier of the second communication apparatus.

In a possible implementation, the sequence of the first identifier of the second communication apparatus may be obtained by processing the first identifier of the second communication apparatus according to a predefined rule. The first identifier of the second communication apparatus is a predefined and/or preconfigured parameter, for example, may be a medium access control (MAC) address of the second communication apparatus, or may be an allocated identifier in the second communication apparatus group. The predefined rule may be, for example, a binary representation. For example, a binary sequence of the first identifier of the second communication apparatus may be obtained by representing the first identifier of the second communication apparatus in binary. It should be understood that the sequence of the first identifier of the second communication apparatus is a sequence of a device identifier.

Further, optionally, the one or more sequences of the signal that carries the feedback information may be obtained by modulating the sequence of the first identifier of the second communication apparatus, or may be obtained by modulating an encoded sequence of the first identifier of the second communication apparatus.

Based on situation 4, when failing to correctly receive the first information, the second communication apparatus sends, to the first communication apparatus, the sequence obtained based on the sequence of the first identifier of the second communication apparatus (namely, the signal that carries the feedback information). It should be noted that the sequence of the first identifier of the second communication apparatus may be pre-generated and stored, or may be generated after the second communication apparatus determines that the second communication apparatus fails to correctly receive the first information.

Correspondingly, when detecting, from the second communication apparatus group, the signal that carries the feedback information, the first communication apparatus may determine that at least one second communication apparatus in the second communication apparatus group fails to correctly receive the first information.

Situation 5: The one or more sequences of the signal that carries the feedback information are obtained based on the sequence of the identifier of the link.

In a possible implementation, the sequence of the identifier of the link may be obtained by processing the identifier of the link according to a predefined rule. Herein, the identifier of the link may be a predefined and/or preconfigured parameter, for example, may be a sequence whose length is 32 bits and that is generated according to a predefined rule (which may be, for example, a distribution rule of "0" and "1" in a sequence of a specific length), or may be a sequence of another length. The link may be understood as a logical channel for information (or data) exchange between the first communication apparatus and the second communication apparatus. The identifier of the link may be understood as an identifier of the logical channel. The identifier of the link is, for example, an access address (AA). The predefined rule may be, for example, a binary representation of the identifier of the link. For example, a binary sequence of the identifier of the link may be obtained by representing the identifier of the link in binary.

Further, optionally, the one or more sequences of the signal that carries the feedback information may be obtained by modulating the sequence of the identifier of the link, or may be obtained by modulating an encoded sequence of the identifier of the link.

Based on situation 5, when failing to correctly receive the first information, the second communication apparatus sends, to the first communication apparatus, the sequence obtained based on the sequence of the identifier of the link (namely, the signal that carries the feedback information). It should be noted that the sequence of the identifier of the link may be pre-generated and stored, or may be generated after the second communication apparatus determines that the second communication apparatus fails to correctly receive the first information.

Correspondingly, when detecting, from the second communication apparatus group, the signal that carries the feedback information, the first communication apparatus may determine that at least one second communication apparatus in the second communication apparatus group fails to correctly receive the first information.

Situation 6: The one or more sequences of the signal that carries the feedback information are obtained based on the preamble sequence and the m-sequence.

Herein, the preamble sequence is at a start location of the one or more sequences of the signal that carries the feedback information. Refer to FIG. 4.

In a possible implementation, the one or more sequences of the signal that carries the feedback information may be obtained by respectively modulating the preamble sequence and the m-sequence, and then combining a modulated preamble sequence and a modulated m-sequence according to a preset combination rule.

In another possible implementation, the one or more sequences of the signal that carries the feedback information may alternatively be obtained by respectively modulating an encoded preamble sequence and an encoded m-sequence, and then combining a modulated preamble sequence and a modulated m-sequence according to a preset combination rule. In other words, the preamble sequence is encoded and modulated to obtain the modulated preamble sequence, the m-sequence is encoded and modulated to obtain the modulated m-sequence, and then the modulated preamble sequence and the modulated m-sequence are combined according to the preset combination rule, to obtain the signal that carries the feedback information.

Based on situation 6, when failing to correctly receive the first information, the second communication apparatus sends, to the first communication apparatus, the sequence obtained based on the preamble sequence and the m-sequence (namely, the signal that carries the feedback information). Correspondingly, when detecting, from the second communication apparatus group, the signal that carries the feedback information, the first communication apparatus may determine that at least one second communication apparatus in the second communication apparatus group fails to correctly receive the first information.

For a further function of the preamble sequence, refer to the description in situation 3. Details are not described herein again.

It should be noted that the first identifier of the second communication apparatus in situation 4 may be notified by the second communication apparatus to the first communication apparatus, or may be negotiated when the first communication apparatus establishes a connection to the second communication apparatus. The identifier of the link in situation 5 may also be notified by the second communication apparatus to the first communication apparatus, or may be negotiated when the first communication apparatus establishes a connection to the second communication apparatus.

It should be noted that the foregoing six cases are merely examples. In this disclosure, the one or more sequences of the signal that carries the feedback information may alternatively be based on another combination of the m-sequence, the Gold sequence, the preamble sequence, the sequence of the first identifier of the second communication apparatus, and the sequence of the identifier of the link. For example, the signal that carries the feedback information may alternatively be obtained based on the m-sequence and the Gold sequence, or may be obtained based on the preamble sequence and the Gold sequence, or may be obtained based on the preamble sequence and the sequence of the first identifier of the second communication apparatus, or may be obtained based on the preamble sequence and the sequence of the identifier of the link. Details are not listed one by one herein again.

It should be noted that a different second communication apparatus in the second communication apparatus group may correspond to at least one different sequence in the one or more sequences that carry the feedback information, or all sequences may be the same. The following provides descriptions in cases.

Case 1: Signals that carry feedback information and that are of different second communication apparatuses in the second communication apparatus group include one or more same sequences.

It may alternatively be understood as the following. When the signal that carries the feedback information includes one sequence, the signals that carry the feedback information and that are of the different second communication apparatuses in the second communication apparatus group include the same one sequence, or when the signal that carries the feedback information includes a plurality of sequences, the signals that carry the feedback information and that are of the different second communication apparatuses in the second communication apparatus group include the same plurality of sequences.

In situation 1, m-sequences corresponding to the different second communication apparatuses in the second communication apparatus group are the same, or shifts of m-sequences corresponding to the different second communication apparatuses in the second communication apparatus group are the same. It should be understood that shifting of the m-sequence means, for example, that some numbers in the m-sequence may be moved to the front. For example, the last 3 numbers in the m-sequence may be shifted to the front of the m-sequence.

Further, optionally, signals carrying feedback information include one or more same sequences obtained based on the same m-sequence. Alternatively, signals carrying feedback information include one or more same sequences obtained based on the same shift of the m-sequences.

It should be noted that a manner in which the different second communication apparatuses in the second communication apparatus group obtain, based on the m-sequence, the one or more same sequences of the signals carrying the feedback information is not limited to a manner based on the same m-sequence or the same shift of the m-sequences. The foregoing is merely an example.

In situation 2, Gold sequences corresponding to the different second communication apparatuses in the second communication apparatus group are the same.

Further, optionally, signals carrying feedback information include one or more same sequences obtained based on the same Gold sequence.

It should be noted that a manner in which the different second communication apparatuses in the second communication apparatus group obtain, based on the Gold sequence, the one or more same sequences of the signals carrying the feedback information is not limited to a manner based on the same Gold sequence. The foregoing is merely an example.

In situation 3, preamble sequences corresponding to the different second communication apparatuses in the second communication apparatus group are the same.

Further, optionally, signals carrying feedback information include one or more same sequences obtained based on the same preamble sequence.

It should be noted that a manner in which the different second communication apparatuses in the second communication apparatus group obtain, based on the preamble sequence, the one or more same sequences of the signals carrying the feedback information is not limited to a manner based on the same preamble sequence. The foregoing is merely an example.

In situation 4, sequences that are of the first identifiers of the second communication apparatuses and that correspond to the different second communication apparatuses in the second communication apparatus group are the same.

Based on this, in a possible implementation, the sequences that are of the first identifiers and that correspond to the different second communication apparatuses in the second communication apparatus group are the same.

Further, optionally, signals carrying feedback information include one or more same sequences obtained based on the same sequence of the first identifiers.

It should be noted that a manner in which the different second communication apparatuses in the second communication apparatus group obtain, based on the sequence of the first identifier, the one or more same sequences of the signals carrying the feedback information is not limited to a manner based on the same sequence of the first identifiers. The foregoing is merely an example.

In situation 5, sequences that are of the identifiers of the links and that correspond to the different second communication apparatuses in the second communication apparatus group are the same.

Based on this, in a possible implementation, the identifiers of the links that correspond to the different second communication apparatuses in the second communication apparatus group are the same.

Further, optionally, signals carrying feedback information include one or more same sequences obtained based on the same sequence of the identifiers of the links.

It should be noted that a manner of obtaining, based on the sequence of the identifier of the link, the one or more same sequences of the signals carrying the feedback information is not limited to a manner based on the same sequence of the identifiers of the links. The foregoing is merely an example.

In situation 6, m-sequences corresponding to the different second communication apparatuses in the second communication apparatus group are the same, and preamble sequences corresponding to the different second communication apparatuses in the second communication apparatus group are also the same, or shifts of m-sequences corresponding to the different second communication apparatuses in the second communication apparatus group are the same, and preamble sequences corresponding to the different second communication apparatuses in the second communication apparatus group are also the same.

Further, optionally, signals carrying feedback information include one or more same sequences obtained based on the same m-sequence and the same preamble sequence. Alternatively, signals carrying feedback information include one or more same sequences obtained based on the same shift of the m-sequences and the same preamble sequence.

It should be noted that a manner of obtaining, based on the preamble sequence and the m-sequence, the one or more same sequences of the signals carrying the feedback information is not limited to a manner based on the same m-sequence and the same preamble sequence or based on the same shift of the m-sequences and the same preamble sequence. The foregoing is merely an example.

Based on case 1, the first communication apparatus may send first indication information to the second communication apparatus group in a multicast manner, where the first indication information indicates at least one of the one or more sequences that are of the signal carrying the feedback information and that corresponds to the second communication apparatus. Alternatively, the first communication apparatus may send first indication information to each second communication apparatus in the second communication apparatus group in a unicast manner. Correspondingly, the second communication apparatus in the second communication apparatus group may determine, based on the received first indication information, the at least one of the one or more sequences of the signal that carries the feedback information.

With reference to the foregoing cases, based on situation 1, the first indication information may indicate a sequence that corresponds to the second communication apparatus and that is obtained based on the m-sequence or a shift of the m-sequence. Based on situation 2, the first indication information may indicate a sequence that corresponds to the second communication apparatus and that is obtained based on the Gold sequence. Based on situation 4, the first indication information may indicate a sequence obtained based on the sequence of the first identifier of the second communication apparatus. Based on situation 5, the first indication information may indicate a sequence obtained based on the sequence of the identifier of the link. Based on situation 6, the first indication information may indicate at least one of the one or more sequences of the signal that carries the feedback information. For example, the first indication information may indicate the sequence that corresponds to the second communication apparatus and that is obtained based on the m-sequence. Based on this, in a possible implementation, the first indication information may include information about a basic sequence or an original sequence that is used to obtain at least one of the one or more sequences of the signal that carries the feedback information. It may alternatively be understood as the following. The first indication information may indirectly indicate the at least one sequence. Alternatively, the first indication information may include information about at least one of the one or more sequences of the signal that carries the feedback information. It may alternatively be understood as the following. The first indication information may directly indicate the at least one sequence.

In a possible implementation, the one or more sequences of the signal that carries the feedback information also include any one sequence or a sequence of any combination of the m-sequence, the Gold sequence, the preamble sequence, the sequence of the first identifier of the second communication apparatus, and the sequence of the identifier of the link. For example, the one or more sequences of the signal that carries the feedback information include the m-sequence, and the first indication information may indicate the m-sequence corresponding to the second communication apparatus or the shift of the m-sequence. For another example, the one or more sequences of the signal that carries the feedback information include the Gold sequence, and the first indication information may indicate the Gold sequence corresponding to the second communication apparatus. For another example, the one or more sequences of the signal that carries the feedback information include the sequence of the first identifier of the second communication apparatus, and the first indication information may indicate the sequence of the first identifier of the second communication apparatus. For another example, the one or more sequences of the signal that carries the feedback information include the sequence of the identifier of the link, and the first indication information may indicate the sequence of the identifier of the link. For another example, the one or more sequences of the signal that carries the feedback information include the m-sequence and the preamble sequence, and the first indication information may indicate the m-sequence. Details are not listed one by one herein again. Based on this, in a possible implementation, the first indication information may include information used to obtain at least one of the one or more sequences of the signal that carries the feedback information. It may alternatively be understood as the following. The first indication information may indirectly indicate the at least one sequence. Alternatively, the first indication information may include information about at least one of the one or more sequences of the signal that carries the feedback information. It may alternatively be understood as the following. The first indication information may directly indicate the at least one sequence.

It should be noted that a second communication apparatus that fails to receive the first indication information may obtain, in a manner predefined in a protocol or a pre-agreed on manner, the signal that carries the feedback information.

It should be further noted that the first indication information may be sent before the first communication apparatus establishes a connection to the second communication apparatus, or may be sent in a process in which the first communication apparatus establishes a connection to the second communication apparatus, or may be sent after the first communication apparatus establishes a connection to the second communication apparatus and before the second communication apparatus sends the feedback information. This is not limited in this disclosure.

Case 2: A different second communication apparatus in the second communication apparatus group corresponds to at least one different sequence in the one or more sequences of the signal carrying the feedback information.

The following shows examples of two possible implementations.

Implementation 1: The one or more sequences of the signal that carries the feedback information include a sequence obtained based on one or more of the m-sequence, the Gold sequence, the preamble sequence, the sequence of the first identifier of the second communication apparatus, or the sequence of the identifier of the link.

With reference to the foregoing cases, that at least one of the one or more sequences that are of signals carrying the feedback information and that correspond to different second communication apparatuses is different is separately described.

In situation 1, m-sequences corresponding to the different second communication apparatuses in the second communication apparatus group are different, or shifts of m-sequences corresponding to the different second communication apparatuses in the second communication apparatus group are different. It should be understood that m-sequences of a same length may have a plurality of different m-sequences because numbers (for example, "01") are arranged in different orders.

Further, optionally, a signal carrying feedback information includes one or more different sequences obtained based on a different m-sequence. A signal carrying feedback information includes one or more different sequences obtained based on a different shift of an m-sequence.

It should be noted that a manner in which the different second communication apparatuses in the second communication apparatus group obtain, based on the m-sequences, the one or more different sequences of the signals carrying the feedback information is not limited to a manner based on the different m-sequences or the different shifts of the m-sequences. The foregoing is merely an example. For example, different modulation manners may be further used based on the same m-sequences, or different modulation manners may be used based on the same shifts of the m-sequences.

In a possible implementation, the first communication apparatus may send the first indication information to the second communication apparatus in the second communication apparatus group in a unicast manner, where the first indication information may indicate the sequence that corresponds to the second communication apparatus and that is obtained based on the m-sequence or a shift of the m-sequence. Correspondingly, the second communication apparatus that receives the first indication information may obtain, based on the first indication information, at least one of the one or more sequences of the signal that carries the feedback information.

Based on this, the first communication apparatus can accurately identify a specific second communication apparatus that is in the second communication apparatus group and that fails to correctly receive the first information. In addition, because the m-sequences corresponding to the second communication apparatuses in the second communication apparatus group are different, the one or more sequences that carry the feedback information and that are obtained based on the different m-sequences are also different. When a plurality of second communication apparatuses simultaneously send the feedback information on the first time-frequency resource, this helps reduce inter-symbol interference caused by multipath and/or incomplete synchronization of signals that carry the feedback information and that are sent by different second communication apparatuses.

In a possible implementation, when the shifts of the m-sequences corresponding to the different second communication apparatuses in the second communication apparatus group are different, the shifts of the m-sequences on which the signal that carries the feedback information is based may include at least two consecutive m-sequences with the same shifts. For example, a shifted m-sequence is 1100101, and two consecutive m-sequences with the same shifts are 11001011100101.

The two consecutive m-sequences with the same shifts are used, so that the first communication apparatus may delay correlation by using one m-sequence, that is, the first communication apparatus may detect existence of the feedback information. Implementation is simple.

In situation 2, Gold sequences corresponding to the different second communication apparatuses in the second communication apparatus group are different.

Further, optionally, a signal carrying feedback information includes one or more different sequences obtained based on a different Gold sequence.

It should be noted that a manner in which the different second communication apparatuses in the second communication apparatus group obtain, based on the Gold sequences, the one or more different sequences of the signals carrying the feedback information is not limited to a manner based on the different Gold sequences. The foregoing is merely an example. For example, different modulation manners may be further used based on the same Gold sequences.

In a possible implementation, the first communication apparatus may send the first indication information to the second communication apparatus in the second communication apparatus group in a unicast manner, where the first indication information may indicate the sequence that corresponds to the second communication apparatus and that is obtained based on the Gold sequence.

In situation 3, preamble sequences corresponding to the different second communication apparatuses in the second communication apparatus group are different.

Further, optionally, a signal carrying feedback information includes one or more different sequences obtained based on a different preamble sequence.

It should be noted that a manner in which the different second communication apparatuses in the second communication apparatus group obtain, based on the preamble sequences, the one or more different sequences of the signals carrying the feedback information is not limited to a manner based on the different preamble sequences. The foregoing is merely an example. For example, different modulation manners may be further used based on the same preamble sequences.

In situation 4, sequences that are of first identifiers of the second communication apparatuses and that correspond to the different second communication apparatuses in the second communication apparatus group are different.

Further, optionally, a signal carrying feedback information includes one or more different sequences obtained based on a sequence of a first identifier of a different second communication apparatus.

It should be noted that a manner in which the different second communication apparatuses in the second communication apparatus group obtain, based on the sequences of the first identifiers, the one or more different sequences of the signals carrying the feedback information is not limited to a manner based on the different sequences of the first identifiers. The foregoing is merely an example. For example, different modulation manners may be further used based on the same sequences of the first identifiers.

In a possible implementation, the first communication apparatus may send the first indication information to the second communication apparatus in the second communication apparatus group in a unicast manner, where the first indication information may indicate the sequence that corresponds to the second communication apparatus and that is obtained based on the sequence of the first identifier.

In situation 5, sequences that are of identifiers of links and that correspond to the different second communication apparatuses in the second communication apparatus group are different.

Further, optionally, a signal carrying feedback information includes one or more different sequences obtained based on a different sequence of an identifier of a link.

It should be noted that a manner of obtaining, based on the sequences of the identifiers of the links, the one or more different sequences of the signals carrying the feedback information is not limited to a manner based on the different sequences of the identifiers of the links. The foregoing is merely an example. For example, different modulation manners may be further used based on the same sequences of the identifiers of the links.

In a possible implementation, the first communication apparatus may send the first indication information to the second communication apparatus in the second communication apparatus group in a unicast manner, where the first indication information may indicate the sequence that corresponds to the second communication apparatus and that is obtained based on the sequence of the identifier of the link.

In situation 6, preamble sequences and/or m-sequences corresponding to the different second communication apparatuses in the second communication apparatus group are different.

In a possible implementation, sequences that correspond to the different second communication apparatuses in the second communication apparatus group and that are obtained based on the preamble sequences and the m-sequences are different.

Further, optionally, a signal carrying feedback information includes one or more different sequences obtained based on a different m-sequence and/or a different preamble sequence. Alternatively, a signal carrying feedback information includes one or more different sequences obtained based on a different shift of an m-sequence and/or a different preamble sequence.

It should be noted that a manner of obtaining, based on the preamble sequences and the m-sequences, the one or more different sequences of the signals carrying the feedback information is not limited to a manner based on the different m-sequences and/or the different preamble sequences, or a manner based on the different shifts of the m-sequences and/or the different preamble sequences. The foregoing is merely an example. For example, different modulation manners may be used based on the same preamble sequences and the same m-sequences, or different modulation manners may be used based on the same shifts of the preamble sequences and the same shifts of the m-sequences.

Further, optionally, the first communication apparatus may send the first indication information to the second communication apparatus in the second communication apparatus group in a unicast manner, where the first indication information may indicate the sequence that corresponds to the second communication apparatus and that is obtained based on the preamble sequence and the m-sequence, or the first indication information may indicate only the sequence that corresponds to the second communication apparatus and that is obtained based on the m-sequence.

Implementation 2: The signal that carries the feedback information includes N sub-sequences, where N is an integer greater than 1. The N sub-sequences herein are a set of sub-sequences included in all sequences of the signal that carries the feedback information.

It may alternatively be understood as the following. One second communication apparatus corresponds to the N sub-sequences, and at least one sub-sequence in the N sub-sequences corresponding to different second communication apparatuses in the second communication apparatus group is different.

FIG. 5 is a schematic flowchart of a method for obtaining N sub-sequences by a second communication apparatus according to this disclosure. The method includes the following steps.

Step 501: A second communication apparatus obtains a second identifier of the second communication apparatus.

Herein, the second identifier of the second communication apparatus may include a MAC address of the second communication apparatus, or may include an intra-group identifier allocated to the second communication apparatus in a second communication apparatus group. It should be noted that the second identifier of the second communication apparatus may be the same as a first identifier of the second communication apparatus. For example, both the second identifier and the first identifier are the MAC address of the second communication apparatus, or both the second identifier and the first identifier are the intra-group identifier allocated to the second communication apparatus in the second communication apparatus group. Alternatively, the second identifier of the second communication apparatus is different from a first identifier. For example, the second identifier of the second communication apparatus is the MAC address of the second communication apparatus, and the first identifier of the second communication apparatus is the allocated intra-group identifier in the second communication apparatus group. For another example, the second identifier of the second communication apparatus is the allocated intra-group identifier in the second communication apparatus group, and the first identifier of the second communication apparatus is the MAC address of the second communication apparatus. This is not limited in this disclosure.

In a possible implementation, the second identifier of the second communication apparatus may be represented by a bit sequence, and bit sequences that represent second identifiers of different second communication apparatuses in a same second communication apparatus group have a same length. In one case, the second identifier of the second communication apparatus may be unique to the second communication apparatus in the second communication apparatus group. For example, when one second communication apparatus belongs to a plurality of communication apparatus groups, the second communication apparatus may use different second identifiers in different communication apparatus groups. In another case, the second communication apparatus may alternatively use a same second identifier in different communication apparatus groups. This is not limited in this disclosure.

To enable at least one of one or more sequences that are of signals carrying feedback information and that correspond to different second communication apparatuses in the second communication apparatus group to be different, second identifiers of the different second communication apparatuses in the second communication apparatus group are different.

The following shows an example of a manner in which the second communication apparatus obtains the second identifier of the second communication apparatus.

In a possible implementation, the first communication apparatus may send second configuration information, where the second configuration information may include information about a second identifier of at least one second communication apparatus in the second communication apparatus group, the information about the second identifier of the second communication apparatus may be pre-agreed upon by the first communication apparatus and the second communication apparatus, or may be specified in a protocol.

For example, the first communication apparatus may send the second configuration information to the second communication apparatus in a unicast manner. Correspondingly, the second communication apparatus may receive the second configuration information from the first communication apparatus, and may obtain the second identifier based on the second configuration information. It should be noted that a second identifier may be randomly generated for a second communication apparatus for which the first communication apparatus does not configure a second identifier.

Alternatively, the first communication apparatus may send the second configuration information to the second communication apparatus group in a multicast manner. Correspondingly, the second communication apparatus group may receive the second configuration information from the first communication apparatus on a corresponding multicast resource, and each second communication apparatus in the second communication apparatus group may obtain a respective second identifier based on the second configuration information.

It should be noted that the second identifiers configured by the first communication apparatus for the different second communication apparatuses in the second communication apparatus group are different. In this way, in the following step 502, different second communication apparatuses correspond to different complex sequences, thereby helping avoid a case in which the first communication apparatus cannot detect feedback information due to reverse cancellation in a specific superposition manner.

It should be further noted that the second communication apparatus may alternatively randomly generate the second identifier of the second communication apparatus. Second identifiers randomly generated by different second communication apparatuses may be the same, or may be different. When the second identifiers randomly generated by the different second communication apparatuses are different, in the foregoing step 501, the second identifier of the second communication apparatus may alternatively be obtained based on this manner.

Step 502: The second communication apparatus may obtain a complex sequence based on the second identifier of the second communication apparatus.

Herein, the second communication apparatus may modulate the second identifier in a preset modulation manner, to obtain the complex sequence. The preset modulation manner may be predefined in a protocol, or may be preconfigured, or may be a phase-shift keying (PSK)-type modulation manner configured by the first communication apparatus for the second communication apparatus group. The PSK-type modulation manner includes but is not limited to binary PSK (BPSK), quadrature PSK (QPSK), 8 PSK, or the like.

In a possible implementation, the obtained complex sequence may be represented as $b_0$, $b_1$, . . . , and $b_{N-1}$, where a length of the complex sequence is N. It should be noted that lengths of complex sequences obtained by different second communication apparatuses in the second communication apparatus group are the same.

The following provides examples of two manners of obtaining the length N of the complex sequence.

Manner 1: The first communication apparatus sends third configuration information.

Herein, the third configuration information indicates N.

In a possible implementation, the first communication apparatus may send the third configuration information to at least one second communication apparatus in the second communication apparatus group in a unicast manner. Correspondingly, the second communication apparatus may receive the third configuration information from the first communication apparatus. Further, the second communication apparatus may determine N based on the received third configuration information.

In another possible implementation, the first communication apparatus may send second configuration information to the second communication apparatus group in a multicast manner. Correspondingly, each second communication apparatus in the second communication apparatus group may receive the third configuration information from the first communication apparatus on a corresponding multicast resource. Further, the second communication apparatus may determine N based on the received third configuration information.

Manner 2: The first communication apparatus may send fourth configuration information.

Herein, the fourth configuration information may indicate information about a maximum quantity of users supported by the second communication apparatus group. Further, the second communication apparatus may determine N based on the received fourth configuration information. Further, a value of N determined by the second communication apparatus should meet the following requirement. When the second communication apparatus group includes a maximum quantity of second communication apparatuses, different second communication apparatuses can correspond to different second identifiers. For example, when the maximum quantity of users supported by the second communication apparatus is 8, N may be determined as 3.

In a possible implementation, the first communication apparatus may send the fourth configuration information to at least one second communication apparatus in the second communication apparatus group in a unicast manner, or may send the fourth configuration information to the second communication apparatus group in a multicast manner.

Step 503: The second communication apparatus obtains a common complex sequence set.

Herein, the common complex sequence set includes at least N common complex sequences (for example, include Q common complex sequences, where Q is an integer greater than or equal to N). The Q common complex sequences may be the same, or the Q common complex sequences may be different from each other, or some common complex sequences in the Q common complex sequences may be the same, and other common complex sequences in the Q common complex sequences are different. It should be noted that same common complex sequences are common complex sequences that have a same length, include same numbers, and have a same arrangement order of the numbers. It should be noted that the common complex sequence set is an ordered set.

For example, for ease of solution description, an example in which Q is equal to N is used for description. The N common complex sequences included in the common complex sequence set are respectively $A^0$ $(=a_0^0, a_1^0, \ldots, a_{L0-1}^0)$, $A^1$ $(=a_0^1, a_1^1, \ldots, a_{L1-1}^1)$, . . . , and $A^{N-1}$ $(=a_0^{N-1}, a_1^{N-1}, \ldots, A_{L(N-1)-1}^{N-1})$. In other words, the common complex sequence set may be represented as $\{A^0$ $(=a_0^0, a_1^0, \ldots, a_{L0-1}^0)$, $(=a_0^1, a_1^1, \ldots, a_{L1-1}^1)$, . . . , $A^{N-1}$ $(=a_0^{N-1}, a_1^{N-1}, \ldots, A_{L(N-1)1}^{N-1})\}$. The N common complex sequences of $A^0$ to $A^{N-1}$ may be same N common complex sequences. It may alternatively be understood as the following. The common complex sequence set includes one common complex sequence. In other words, the N common complex sequences included in the common complex sequence set may be a same common complex sequence. Alternatively, the N common complex sequences may be N common complex sequences that are different from each other. Alternatively, some common complex sequences in the N common complex sequences are the same, and the other common complex sequences in the N common complex sequences are different. For example, $A^0$ $(=a_0^0, a_1^0, \ldots, a_{L0-1}^0)$ and $A^1$ $(=a_0^1, a_1^1, \ldots, a_{L1-1}^1)$ in the N common complex sequences are the same, and the other common complex sequences in the N common complex sequences are different. For another example, $A^2$ $(=a_0^2, a_1^2, \ldots, a_{L0-1}^2)$ and $A^4$ $(=a_0^4, a_1^4, \ldots, a_{L1-1}^4)$ in the N common complex sequences are the same, and the other common complex sequences in the N common complex sequences are different.

In the following, any common complex sequence (namely, an $i^{th}$ common complex sequence) in the common complex sequence set is used as an example for description.

The $i^{th}$ common complex sequence $A^i$ may include a phase-modulated first bit sequence, where the first bit sequence may include at least one of an m-sequence, a Gold sequence, or a sequence of an identifier of the second communication apparatus group. Alternatively, the $i^{th}$ common complex sequence may sequentially include a preamble sequence and a phase-modulated first bit sequence. It may alternatively be understood as the following. The preamble sequence in the $i^{th}$ common complex sequence is at a start location, and the phase-modulated first bit sequence is located after the preamble sequence. For phase modulation, refer to the foregoing related descriptions. Details are not described herein again. It may alternatively be understood as the following: i may be any integer in a closed interval [1, N], so that the common complex sequence set can be obtained.

In a possible implementation, the common complex sequence set may be predefined in a protocol, or may be preconfigured, or may be a known set configured by the first communication apparatus for the second communication apparatus group. It may alternatively be understood as the following. Each common complex sequence in the common complex sequence set may be predefined in a protocol, or may be preconfigured, or may be a known sequence configured by the first communication apparatus for the second communication apparatus group.

It should be noted that different second communication apparatuses in the second communication apparatus group correspond to a same common complex sequence set. In other words, the second communication apparatus group corresponds to one common complex sequence set. In addition, common complex sequence sets of different communication apparatus groups may be the same or may be different. This is not limited in this disclosure.

Step 504: The second communication apparatus may obtain the N sub-sequences based on the complex sequence and the common complex sequence set.

Herein, any sub-sequence (namely, an $i^{th}$ sub-sequence) in the N sub-sequences is used as an example. The $i^{th}$ sub-sequence meets $A^i \times b_i$, where $A^i$ is the $i^{th}$ common complex sequence in the common complex sequence set, and $b_i$ is an $i^{th}$ complex number in the complex sequence whose length is N and that is obtained based on the second identifier of the second communication apparatus. For example, when i=0, $A^i$ is $A^0$ $(=a_0^0, a_1^0, \ldots, a_{L0-1}^0)$, $b_i$ is $b_0$, and $A^0 \times b_0$ represents that $a_0^0, a_1^0, \ldots,$ and $a_{L0-1}^0$ are sequentially multiplied by $b_0$, to obtain the $i^{th}$ sub-sequence. It should be noted that i is any integer in the closed interval [1, N], so that the N sub-sequences may be obtained. The N sub-sequences are respectively $b_0 \times A^0$, $b_1 \times A^1$ and $b_{N-1} \times A^{N-1}$. It should be noted that the second communication apparatus may select, in a predefined manner, N common complex sequences from the Q common complex sequences included in the common complex sequence set.

In a possible implementation, $i^{th}$ sub-sequences corresponding to different second communication apparatuses in the second communication apparatus group have a same length and a same start location in one or more sequences. For example, first sub-sequences $b_0 \times A^0$ corresponding to the different second communication apparatuses in the second communication apparatus group have a same length, and the first sub-sequence $b_0 \times A^0$ is at a same start location of one or more sequences of a signal that carries feedback information.

In the foregoing step 501 to step 504, the $i^{th}$ sub-sequences corresponding to the different second communication apparatuses in the second communication apparatus group have a same length and a same start location in the one or more sequences, so that $A^i \times b_i$ that the $i^{th}$ sub-sequences in the signals that are sent by the different second communication apparatuses and that carry the feedback information meet can be aligned. When second identifiers of the different second communication apparatuses in the second communication apparatus group are different, complex sequences generated based on the second identifiers of the second communication apparatuses are different from each other. Therefore, N sub-sequences of the different second communication apparatuses are also different. This helps avoid a case in which the first communication apparatus cannot detect feedback information due to reverse cancellation in a specific superposition manner.

It should be noted that the foregoing two implementations are merely examples. It should be understood that one or more sequences that correspond to some second communication apparatuses in the second communication apparatus group and that carry the feedback information may be all the same, and at least one of one or more sequences that correspond to the other second communication apparatuses in the second communication apparatus group and that carry the feedback information is different. With reference to FIG. 2C, for example, one or more sequences that carry the feedback information and that correspond to the display and the microphone in the second communication domain are all the same, and at least one of one or more sequences that carry the feedback information and that correspond to the sound box and the mobile phone is different.

The following shows an example of a method for obtaining a first time-frequency resource by the second communication apparatus group.

FIG. 6 is a schematic flowchart of a method for obtaining a first time-frequency resource by a second communication apparatus according to this disclosure. The method includes the following steps.

Step 601: A second communication apparatus sends capability information to a first communication apparatus. Correspondingly, the first communication apparatus receives the capability information from the second communication apparatus.

Herein, at least one second communication apparatus in a second communication apparatus group may send the capability information to the first communication apparatus. In a possible implementation, the capability information of the second communication apparatus may alternatively be predefined in a protocol. When there is a second communication apparatus that does not send capability information to the first communication apparatus and that is in the second communication apparatus group, the first communication apparatus may determine, based on the protocol, the capability information of the second communication apparatus that does not send the capability information. The capability information of the second communication apparatus includes but is not limited to a processing rate, an interframe space (IFS), a receive/transmit transition time interval, and the like of the second communication apparatus. The IFS refers to duration in which each second communication apparatus in the second communication apparatus group waits for an IFS interval to send feedback information after receiving the first information.

Step 601 is an optional step.

Step 602: The first communication apparatus may obtain a first time-frequency resource based on the capability information of the second communication apparatus.

Herein, the first time-frequency resource is a feedback resource used for any second communication apparatus in the second communication apparatus group.

In a possible implementation, the first time-frequency resource may be configured for any second communication apparatus in the second communication apparatus group based on first configuration information. It may alternatively be understood as the following. The first configuration information is used to configure the first time-frequency resource for each second communication apparatus in the second communication apparatus group.

In a possible implementation, the first configuration information may directly indicate the first time-frequency resource, or may indicate related information of the first time-frequency resource. For example, the first configuration information may indicate a time domain resource in the first time-frequency resource, indicate an offset, or indicate a period.

For example, the first communication apparatus may determine the first time-frequency resource based on received capability information of a second communication apparatus that has a slowest processing rate, a largest interframe space, and a largest receive/transmit transition time interval in the second communication apparatus group. In this way, moments at which the second communication apparatuses in the second communication apparatus group send the feedback information can be aligned as much as possible. In addition, this helps reduce a collision probability of sending the feedback information by the second communication apparatuses in the second communication apparatus group.

Step 603: The first communication apparatus sends the first configuration information. Correspondingly, the second communication apparatus may receive the first configuration information from the first communication apparatus.

Herein, the first communication apparatus may send the first configuration information to the second communication apparatus group. In other words, the first communication apparatus may send the first configuration information to the second communication apparatus group in a multicast manner. Alternatively, the first communication apparatus may send the first configuration information to at least one second communication apparatus in the second communication apparatus group in a unicast manner.

When the first configuration information indicates the related information of the first time-frequency resource, the second communication apparatus may determine the first time-frequency resource based on the related information indicating the first time-frequency resource and a protocol specification.

In the foregoing step 601 to step 603, the first communication apparatus may configure the first time-frequency resource for the second communication apparatus in the second communication apparatus group, so that the second communication apparatus may obtain the first time-frequency resource for sending the feedback information.

It should be noted that some second communication apparatuses in the second communication apparatus group may use a same first time-frequency resource. For example, the second communication apparatus group includes five second communication apparatuses. Three second communication apparatuses in the five second communication apparatuses send feedback information by using the first time-frequency resource, and the other two second communication apparatuses in the five second communication apparatuses may send feedback information by using another time-frequency resource. In other words, the first time-frequency resource is a feedback resource used for some second communication apparatuses in the second communication apparatus group.

It may be understood that, to implement functions in the foregoing embodiments, the first communication apparatus and the second communication apparatus each include a corresponding hardware structure and/or software module for performing each function. A person skilled in the art should be easily aware that, with reference with modules and method steps in the examples described in embodiments disclosed in this disclosure, this disclosure can be implemented by hardware or a combination of hardware and computer software. Whether a function is performed by using hardware or hardware driven by computer software depends on particular application scenarios and design constraints of the technical solutions.

Figure 7:
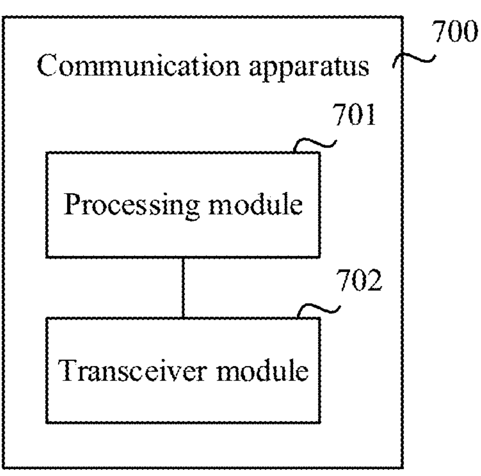
FIG. 7 is a schematic diagram of a structure of a communication apparatus according to this disclosure.
Figure 8:
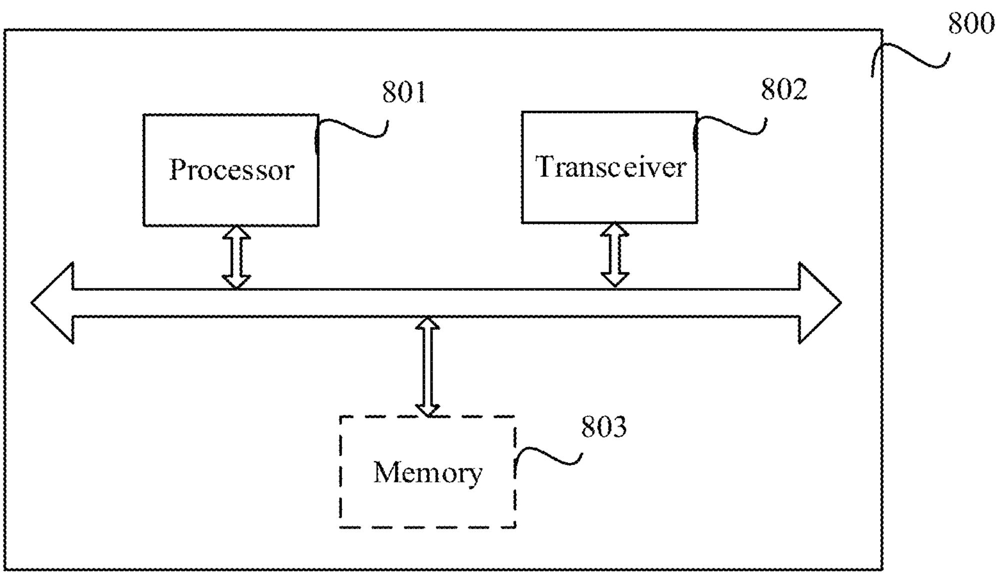
FIG. 8 is a schematic diagram of a structure of a communication apparatus according to this disclosure.

Based on the foregoing content and a same concept, FIG. 7 and FIG. 8 each are a schematic diagram of a possible structure of a communication apparatus according to this disclosure. These communication apparatuses may be configured to implement functions of the first communication apparatus or the second communication apparatus in the foregoing method embodiments, and therefore can also implement beneficial effects of the foregoing method embodiments. In this disclosure, the communication apparatus may be the primary node shown in FIG. 1, or may be the secondary node shown in FIG. 1, or may be a module (for example, a chip) applied to the primary node or the secondary node. The communication apparatus may be the terminal device in FIG. 2A, or may be the network device in FIG. 2A, or may be a module (for example, a chip) applied to the terminal device or the network device. The communication apparatus may be the AP in FIG. 2B, or may be the station in FIG. 2B, or may be a module (for example, a chip) applied to the AP or the station. The communication apparatus may be the display, the microphone, the sound box, or the mobile phone in FIG. 2C, or may be the CDC in FIG. 2C. Alternatively, the communication apparatus may be the headset or the wearable device in FIG. 2C, or may be the mobile phone in FIG. 2C. Alternatively, the communication apparatus may be the mobile phone key and the vehicle key in FIG. 2C, or may be the PEPS system in FIG. 2C.

As shown in FIG. 7, a communication apparatus 700 includes a processing module 701 and a transceiver module 702. The communication apparatus 700 is configured to implement a function of the first apparatus or the second communication apparatus in the method embodiment shown in FIG. 3, FIG. 5 or FIG. 6.

When the communication apparatus 700 is configured to implement the function of the first communication apparatus in the method embodiment shown in FIG. 3, the transceiver module 702 is configured to send the first information to the second communication apparatus group, where the second communication apparatus group includes at least two second communication apparatuses, and the processing module 701 is configured to detect, on the first time-frequency resource, feedback information from at least one second communication apparatus in the second communication apparatus group, where the first time-frequency resource is a feedback resource used for any second communication apparatus in the second communication apparatus group, and the feedback information indicates that there is at least one second communication apparatus that fails to correctly receive the first information and that is in the second communication apparatus group.

When the communication apparatus 700 is configured to implement the function of the second communication apparatus in the method embodiment shown in FIG. 3, the processing module 701 is configured to detect the first information, and when the first information fails to be correctly received, the transceiver module 702 is configured to send feedback information on the first time-frequency resource, where the first time-frequency resource is a feedback resource used for any second communication apparatus in the second communication apparatus group, the second communication apparatus group includes at least two second communication apparatuses, and the feedback information indicates that there is at least one second communication apparatus that fails to correctly receive the first information and that is in the second communication apparatus group.

For more detailed descriptions of the processing module 701 and the transceiver module 702, directly refer to the related descriptions in the method embodiment shown in FIG. 3. Details are not described one by one herein again.

It should be understood that, in this embodiment of this disclosure, the processing module 701 may be implemented as a processor or a processor-related circuit component, and the transceiver module 702 may be implemented as a transceiver or a transceiver-related circuit component.

Based on the foregoing content and a same concept, as shown in FIG. 8, this disclosure further provides a communication apparatus 800. The communication apparatus 800 may include a processor 801 and a transceiver 802. The processor 801 and the transceiver 802 are coupled to each other. It may be understood that the transceiver 802 may be a communication interface, an interface circuit, or an input/output interface. Optionally, the communication apparatus 800 may further include a memory 803 configured to store instructions to be executed by the processor 801, store input data required for running instructions by the processor 801, or store data generated after the processor 801 runs instructions.

When the communication apparatus 800 is configured to implement the method shown in FIG. 3, the processor 801 is configured to perform a function of the processing module 701, and the transceiver 802 is configured to perform a function of the transceiver module 702.

When the communication apparatus is a chip applied to the first communication apparatus, the first communication apparatus chip implements functions of the first communication apparatus in the foregoing method embodiments. The first communication apparatus chip receives information from another module (for example, a radio frequency module or an antenna) in the first communication apparatus, where the information is sent by the second communication apparatus to the first communication apparatus. Alternatively, the first communication apparatus chip sends information to another module (for example, a radio frequency module or an antenna) in the first communication apparatus, where the information is sent by the first communication apparatus to the second communication apparatus.

When the communication apparatus is a chip applied to the second communication apparatus, the second communication apparatus chip implements functions of the second communication apparatus in the foregoing method embodiments. The second communication apparatus chip receives information from another module (for example, a radio frequency module or an antenna) in the second communication apparatus, where the information is sent by the first communication apparatus to the second communication apparatus. Alternatively, the second communication apparatus chip sends information to another module (for example, a radio frequency module or an antenna) in the second communication apparatus, where the information is sent by the second communication apparatus to the first communication apparatus.

Based on the foregoing content and a same concept, this disclosure provides a communication system. The communication system may include the foregoing one or more first communication apparatuses and one or more second communication apparatuses. The first communication apparatus may perform any method on a first communication apparatus side, and the second communication apparatus may perform any method on a second communication apparatus side. For possible implementations of the second communication apparatus and the first communication apparatus, refer to the foregoing related descriptions. Details are not described herein again.

Based on the foregoing content and a same concept, this disclosure provides a terminal device. The terminal device may be the foregoing first communication apparatus, or may be the foregoing second communication apparatus. The first communication apparatus may perform any method on a first communication apparatus side, and the second communication apparatus may perform any method on a second communication apparatus side. For possible implementations of the second communication apparatus and the first communication apparatus, refer to the foregoing related descriptions. Details are not described herein again.

In a possible implementation, the terminal device may be, for example, an intelligent terminal, a smartphone, a smart home device, a smart manufacturing device, a robot, an unmanned aerial vehicle, or an intelligent transportation device (like an AGV or an unmanned transportation vehicle).

It may be understood that the processor in embodiments of this disclosure may be a central processing unit (CPU), or may be another general-purpose processor, a digital signal processor (DSP), an application-specific integrated circuit (ASIC), a field-programmable gate array (FPGA) or another programmable logic device, a transistor logic device, a hardware component, or any combination thereof. The general-purpose processor may be a microprocessor or may be any regular processor.

The method steps in embodiments of this disclosure may be implemented in a hardware manner, or may be implemented in a manner of executing software instructions by the processor. The software instructions may include a corresponding software module. The software module may be stored in a random-access memory (RAM), a flash memory, a read-only memory (ROM), a programmable ROM (PROM), an erasable PROM (EPROM), an electrically EPROM (EEPROM), a register, a hard disk, a removable hard disk, a compact disc (CD) ROM (CD-ROM), or any other form of storage medium well-known in the art. For example, a storage medium is coupled to a processor, so that the processor can read information from the storage medium and write information into the storage medium. Certainly, the storage medium may alternatively be a component of the processor. The processor and the storage medium may be disposed in an ASIC. In addition, the ASIC may be located in the first communication apparatus or the second communication apparatus. Certainly, the processor and the storage medium may exist in the first communication apparatus or the second communication apparatus as discrete components.

All or some of the foregoing embodiments may be implemented by using software, hardware, firmware, or any combination thereof. When software is used to implement embodiments, all or some of the embodiments may be implemented in a form of a computer program product. The computer program product includes one or more computer programs or instructions. When the computer programs or the instructions are loaded and executed on a computer, the procedures or functions in embodiments of this disclosure are all or partially performed. The computer may be a general-purpose computer, a dedicated computer, a computer network, a network device, a user device, or another programmable apparatus. The computer programs or the instructions may be stored in a computer-readable storage medium or may be transmitted from a computer-readable storage medium to another computer-readable storage medium. For example, the computer programs or the instructions may be transmitted from a website, computer, server, or data center to another website, computer, server, or data center in a wired or wireless manner. The computer-readable storage medium may be any usable medium accessible by a computer, or a data storage device, like a server or a data center, integrating one or more usable media. The usable medium may be a magnetic medium like a floppy disk, a hard disk, or a magnetic tape, may be an optical medium like a DIGITAL VERSATILE DISC (DVD), or may be a semiconductor medium like a solid state drive (SSD).

In embodiments of this disclosure, unless otherwise stated or there is a logic conflict, terms and/or descriptions between different embodiments are consistent and may be mutually referenced, and technical features in different embodiments may be combined into a new embodiment based on an internal logical relationship thereof.

In this disclosure, "at least one" means one or more, and "a plurality of" means two or more. "At least one of the following items (pieces)" or a similar expression thereof refers to any combination of these items, including any combination of singular items (pieces) or plural items (pieces). For example, at least one of a, b, or c may indicate a, b, c, a and b, a and c, b and c, or a, b, and c, where a, b, and c may be singular or plural. "And/or" describes an association relationship between associated objects, and represents that three relationships may exist. For example, A and/or B may represent the following cases: only A exists, both A and B exist, and only B exists, where A and B may be singular or plural. In the text descriptions of this disclosure, the character "/" generally indicates an "or" relationship between the associated objects. In a formula in this disclosure, the character "/" indicates a "division" relationship between the associated objects. In addition, in this disclosure, the word "example" represents giving an example, an illustration, or a description. Any embodiment or design scheme described as an "example" in this disclosure should not be explained as being more preferred or having more advantages than another embodiment or design scheme. Alternatively, it may be understood as the following. The word "example" is used to present a concept in a specific manner, and does not constitute a limitation on this disclosure.

It may be understood that various numbers in embodiments of this disclosure are merely used for differentiation for ease of description, and are not used to limit the scope of embodiments of this disclosure. The sequence numbers of the foregoing processes do not mean execution sequences, and the execution sequences of the processes should be determined based on functions and internal logic of the processes. The terms "first", "second", and another similar expression are intended to distinguish between similar objects but do not necessarily indicate a specific order or sequence. In addition, the terms "include", "have", and any variant thereof are intended to cover non-exclusive inclusion, for example, include a series of steps or modules. Methods, systems, products, or devices are not necessarily limited to those steps or modules that are clearly listed, but may include other steps or modules that are not clearly listed or that are inherent to such processes, methods, products, or devices.

It is clear that a person skilled in the art can make various modifications and variations to this disclosure without departing from the scope of this disclosure. In this way, this disclosure is intended to cover these modifications and variations of this disclosure provided that they fall within the scope of protection defined by the following claims and their equivalent technologies.

What is claimed is:

1. A method comprising:

sending, using a multicast resource, first information to a communication apparatus group comprising a plurality of communication apparatuses; and detecting, on a unified time-frequency resource and from a first communication apparatus in the communication apparatus group, a signal that carries feedback information indicating that the first communication apparatus has failed to correctly receive the first information on the multicast resource, wherein the unified time-frequency resource is a shared feedback resource useable by all communication apparatus in the communication apparatus group, and wherein the signal comprises one or more sequences, and wherein at least one of the one or more sequences is:

predefined or preconfigured;

based on a first predefined rule; or based on a predefined parameter or a preconfigured parameter and based on a second predefined rule.

2. The method of claim 1, further comprising sending configuration information indicating the unified time-frequency resource.

3. The method of claim 1, further comprising receiving, from the unified time-frequency resource, capability information of the first communication apparatus.

4. The method of claim 1, wherein when detecting the feedback information on the unified time-frequency resource, the method further comprises sending, using the multicast resource, second information, and wherein the second information is the same as the first information or is based on original information corresponding to the first information.

5. The method of claim 1 further comprising:

further sending the first information using a first symbol rate; and further detecting the feedback information based on a second symbol rate, wherein the first symbol rate is greater than the second symbol rate.

6. The method of claim 1, wherein the one or more sequences comprise a first sequence based on any one or any combination of the following:

an m-sequence;

a Gold sequence;

a preamble sequence;

a second sequence of a first identifier of the first communication apparatus; or a third sequence of a second identifier of a link.

7. The method of claim 1, wherein the one or more sequences comprise a preamble sequence, and wherein the preamble sequence is at a start location of the one or more sequences.

8. The method of claim 1, wherein the communication apparatus apparatuses respectively correspond to different sequences in the one or more sequences.

9. The method of claim 1, wherein the one or more sequences comprise m-sequences, and wherein m-sequences corresponding to different communication apparatuses in the communication apparatus group are different or shifts of the m-sequences are different.

10. The method of claim 1, wherein the one or more sequences comprise N sub-sequences, wherein N is an integer greater than 1, wherein $i^{th}$ sub-sequences corresponding to different communication apparatuses in the communication apparatus group have a same length and a same start location in the one or more sequences, wherein each of the $i^{th}$ sub-sequences is any one of the N sub-sequences, wherein each of the $i^{th}$ sub-sequences meets Aixbi, wherein $b_i$ is an $i^{th}$ complex number in a complex sequence with a length that is N and that is based on a first identifier of the first communication apparatus, wherein $A^i$ is an $i^{th}$ common complex sequence in a common complex sequence set, and wherein the different communication apparatuses correspond to the common complex sequence set.

11. The method of claim 10, wherein the common complex sequence set is predefined or preconfigured.

12. The method of claim 10, wherein the $i^{th}$ common complex sequence comprises either a phase-modulated first bit sequence or a preamble sequence and the phase-modulated first bit sequence, and wherein the phase-modulated first bit sequence comprises at least one of an m-sequence, a Gold sequence, or a sequence of a second identifier of the communication apparatus group.

13. A method comprising:

attempting to detect first information from a multicast resource;

attempting to receive the first information based on a first symbol rate; and sending, using a unified time-frequency resource, to a first communication apparatus, and using a second symbol rate, feedback information indicating that a second communication apparatus in a communication apparatus group comprising a plurality of communication apparatuses has failed to correctly receive the first information, wherein the unified time-frequency resource is a shared feedback resource useable by all second communication apparatus in the communication apparatus group, and wherein the first symbol rate is greater than the second symbol rate.

14. The method of claim 13, further comprising receiving, from the first communication apparatus, configuration information indicating the unified time-frequency resource.

15. The method of claim 13, further comprising sending, to the first communication apparatus, capability information of the second communication apparatus.

16. The method of claim 13, further comprising receiving, using the multicast resource from the first communication apparatus, second information, wherein the second information is the same as the first information or the second information and the first information correspond to the same original information.

17. The method of claim 13, wherein a signal that carries the feedback information comprises one or more sequences, and wherein at least one of the one or more sequences is:

predefined or preconfigured;

obtained according to a first predefined rule; or obtained according to a predefined or preconfigured parameter and according to a second predefined rule.

18. A first apparatus comprising:

a memory configured to store instructions; and at least one processor coupled to the memory and configured to execute the instructions to cause the first apparatus to:

send, using a multicast resource, first information to a communication apparatus group comprising a plurality of communication apparatuses; and detect, on a unified time-frequency resource and from a second communication apparatus in the communication apparatus group, a signal that carries feedback information indicating that the second communication apparatus has failed to correctly receive the first information, wherein the unified time-frequency resource is a shared feedback resource useable by all communication apparatus in the communication apparatus group, wherein the signal comprises one or more sequences, and wherein at least one of the one or more sequences is:

predefined or preconfigured;

based on a first predefined rule; or based on a predefined parameter or a preconfigured parameter and based on a second predefined rule, and wherein the communication apparatuses respectively correspond to different sequences in the one or more sequences.

19. The first apparatus of claim 18, wherein the at least one processor is further configured to execute the instructions to further cause the first apparatus to send configuration information indicating the unified time-frequency resource.

20. The first apparatus of claim 18, wherein the at least one processor is further configured to execute the instructions to further cause the first apparatus to receive, from the unified time-frequency resource, capability information of the first communication apparatus.

* * * * *